United States Patent
Shin et al.

(10) Patent No.: US 9,768,820 B2
(45) Date of Patent: Sep. 19, 2017

(54) MOBILE TERMINAL

(71) Applicant: LG ELECTRONICS INC., Seoul (KR)

(72) Inventors: Choonghwan Shin, Seoul (KR); Byunghwa Lee, Seoul (KR); Sungtaek Oh, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/100,910

(22) PCT Filed: Feb. 21, 2014

(86) PCT No.: PCT/KR2014/001417
§ 371 (c)(1),
(2) Date: Jun. 1, 2016

(87) PCT Pub. No.: WO2015/083896
PCT Pub. Date: Jun. 11, 2015

(65) Prior Publication Data
US 2016/0308572 A1  Oct. 20, 2016

(30) Foreign Application Priority Data
Dec. 2, 2013 (KR) .................. 10-2013-0148428

(51) Int. Cl.
*H04M 1/00* (2006.01)
*H04B 1/3888* (2015.01)
(Continued)

(52) U.S. Cl.
CPC .......... *H04B 1/3888* (2013.01); *H04B 1/385* (2013.01); *H04M 1/0202* (2013.01);
(Continued)

(58) Field of Classification Search
CPC ............. H04M 1/0214; H04M 1/0216; H04M 1/0218; H04M 1/0222; H04M 1/0229;
(Continued)

(56) References Cited

U.S. PATENT DOCUMENTS

| 7,228,158 B2* | 6/2007 | Lee ................. H04M 1/0216 |
| | | 379/433.02 |
| 7,505,582 B2* | 3/2009 | Hickey ............ H04M 1/0212 |
| | | 379/433.13 |

(Continued)

FOREIGN PATENT DOCUMENTS

| JP | 2009-111669 A | 5/2009 |
| KR | 10-2005-0073150 A | 7/2005 |
| KR | 10-2009-0089011 A | 8/2009 |

*Primary Examiner* — Duc M Nguyen
(74) *Attorney, Agent, or Firm* — Birch, Stewart, Kolasch & Birch, LLP

(57) ABSTRACT

The present invention relates to a clip-type mobile terminal which can be conveniently placed on various parts of the body and other objects. The clip-type mobile terminal comprises a case defining the exterior of the mobile terminal, a display panel disposed on the front surface part of the case, and a battery disposed on the rear surface part of the case. The case comprises a first frame supporting the display panel, a second frame supporting the battery, and a connection frame connecting one side of the first frame and one side of the second frame. Here, the first frame and the second frame may be spaced apart from each other by a certain gap.

19 Claims, 29 Drawing Sheets

(51) Int. Cl.
*H04M 1/02* (2006.01)
*H04B 1/3827* (2015.01)

(52) U.S. Cl.
CPC ... *H04B 2001/3855* (2013.01); *H04M 1/0249* (2013.01); *H04M 1/0262* (2013.01); *H04M 1/0266* (2013.01)

(58) Field of Classification Search
CPC . H04M 1/0249; H04M 1/0262; H04M 1/0266
USPC ....................................................... 455/575.3
See application file for complete search history.

(56) References Cited

U.S. PATENT DOCUMENTS

| | | | | |
|---|---|---|---|---|
| 7,644,489 | B2* | 1/2010 | Arora | B81C 1/00007 29/607 |
| 2005/0215296 | A1* | 9/2005 | Fujihara | H04M 1/021 455/575.3 |
| 2007/0298850 | A1* | 12/2007 | Miyata | H04M 1/021 455/575.3 |
| 2008/0102907 | A1* | 5/2008 | Komine | H04M 1/0216 455/575.3 |
| 2009/0007958 | A1* | 1/2009 | Ho | H01M 10/465 136/245 |
| 2009/0069060 | A1* | 3/2009 | Kim | A45F 5/02 455/575.6 |
| 2009/0104949 | A1* | 4/2009 | Sato | H04M 1/0214 455/575.3 |
| 2009/0126155 | A1* | 5/2009 | Nieuwenhuizen | H04M 1/0216 16/302 |
| 2009/0149225 | A1* | 6/2009 | Yokota | H04M 1/03 455/575.3 |
| 2009/0325654 | A1 | 12/2009 | Shi | |
| 2010/0317413 | A1* | 12/2010 | Tan | H02J 7/0044 455/573 |
| 2013/0084919 | A1* | 4/2013 | Glynn | H04B 1/3833 455/566 |
| 2013/0151196 | A1 | 6/2013 | Yuen et al. | |
| 2015/0055287 | A1* | 2/2015 | Seo | G06F 1/1652 361/679.27 |
| 2015/0233162 | A1* | 8/2015 | Lee | H04M 1/02 16/223 |
| 2016/0098064 | A1* | 4/2016 | Becze | G06F 3/1438 361/679.3 |

* cited by examiner

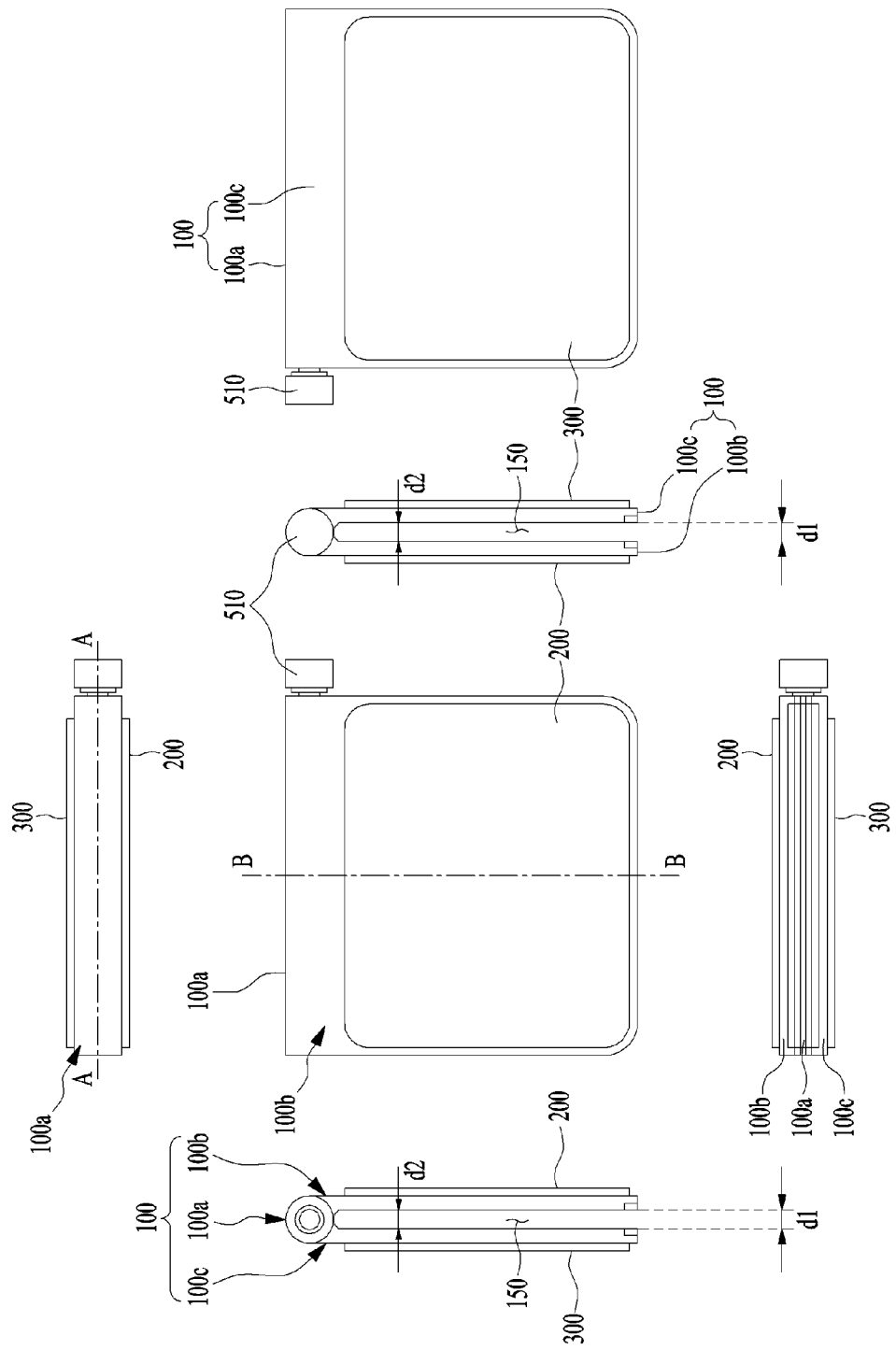

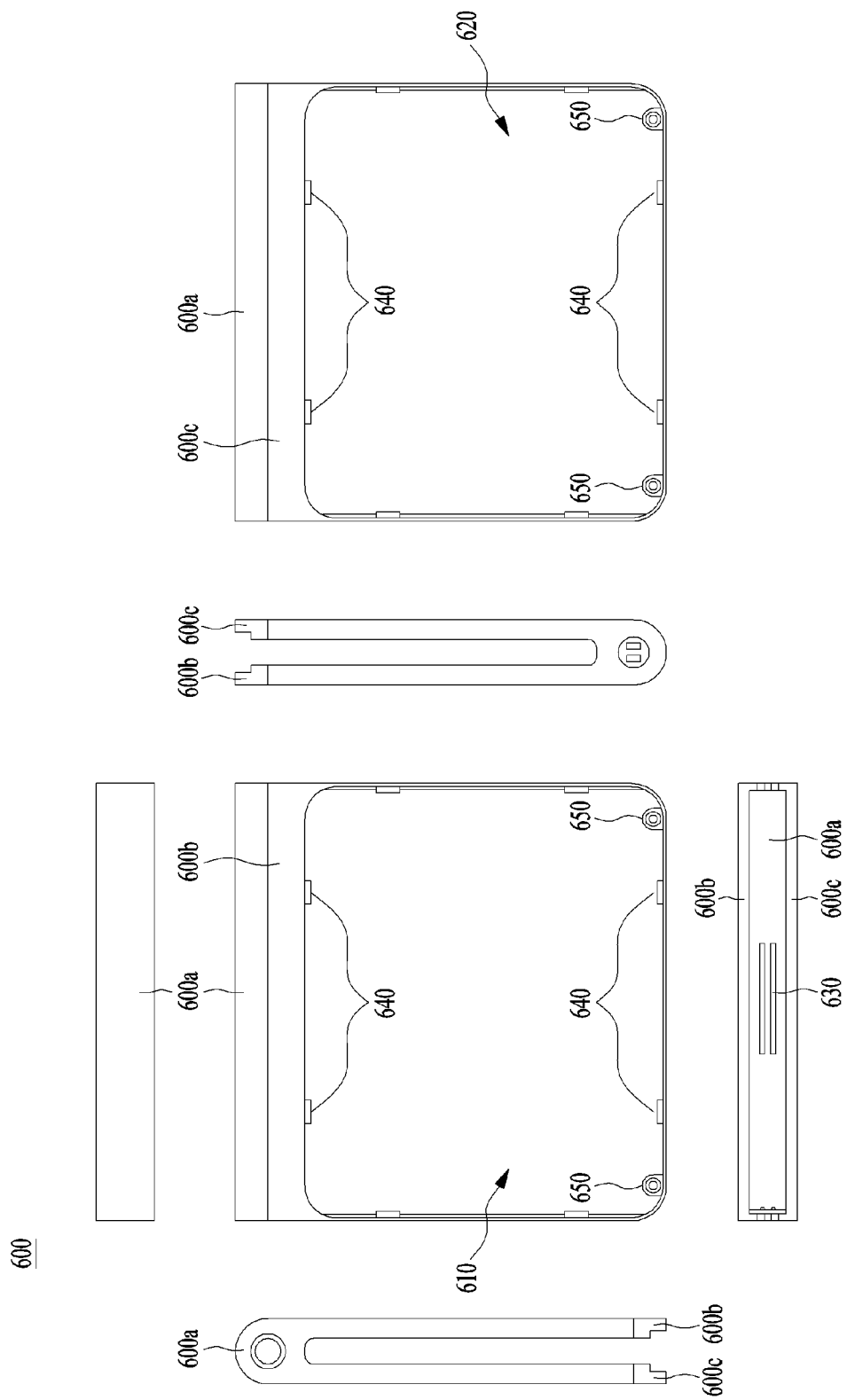

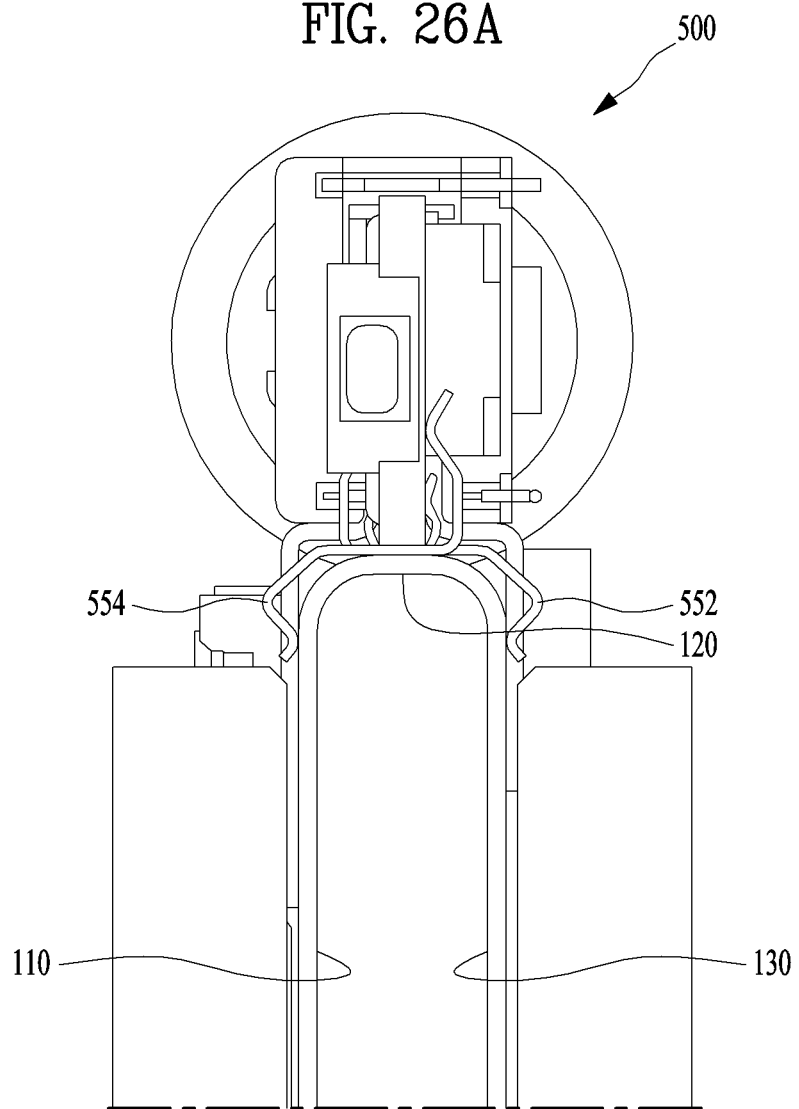

MOBILE TERMINAL

CROSS REFERENCE TO RELATED APPLICATIONS

This application is the National Phase of PCT International Application No. PCT/KR2014/001417, filed on Feb. 21, 2014, which claims priority under 35 U.S.C. 119(a) to Patent Application No. 10-2013-0148428, filed in Republic of Korea on Dec. 2, 2013, all of which are hereby expressly incorporated by reference into the present application.

TECHNICAL FIELD

The present invention relates to a mobile terminal, and more particularly, to a clip-type mobile terminal configured to be conveniently attached to or mounted on various parts of user's body or other objects.

BACKGROUND ART

Terminals may be generally classified as mobile/portable terminals or stationary terminals according to their mobility.

Mobile terminals may also be classified as handheld terminals or vehicle mounted terminals according to whether or not a user can directly carry the terminal.

As functions of the terminal are getting diversified, the terminal tends to be implemented as a multimedia player provided with composite functions such as photographing of photos or videos, playback of music or video files, game play, broadcast reception and the like for example.

As a mobile terminal is structurally configured not to be mounted on a human body, an object or the like, a user inevitably uses the mobile terminal in a manner of holding the mobile terminal with user's hand directly or mounting the mobile terminal on an additional mounting or holding device.

When a user uses a mobile terminal by holding it with user's hand directly or keeping it in a pocket, since the mobile terminal easily leaves the user's hand or pocket, problems of high damage or loss risks.

Moreover, if a user uses a mobile terminal by mounting it on a holding device, since the holding device should be additionally installed or carried, it causes problems of inconvenience and additional costs.

For such reasons, the demand for development of a mobile terminal equipped with a mounting function of facilitating the mobile terminal to be mounted on or attached to various parts of user's body or other objects will be rising.

DISCLOSURE OF THE INVENTION

Technical Task

Accordingly, the present invention is directed to substantially obviate one or more problems due to limitations and disadvantages of the related art. One technical task of the present invention is to a clip-type mobile terminal, which can be conveniently mounted on or attached to various parts of user's body or other objects by having a clip type of U shape in a manner that a first frame supporting a display panel and a second frame supporting a battery are disposed to be spaced apart from each other in a predetermined distance.

Another technical task of the present invention is to a clip-type mobile terminal, which can perform a prescribed operation by recognizing whether the clip-type mobile terminal is mounted in a manner of disposing a sensor in a space between a first frame supporting a display panel and a second frame supporting a battery.

Further technical task of the present invention is to a clip-type mobile terminal, which can perform a prescribed operation by recognizing a presence or non-presence of an electric connection between a finger clip and a frame in a manner of disposing the finger clip configured to connect a circuit module and a frame to each other.

TECHNICAL SOLUTIONS

In one technical aspect of the present invention, provided herein is a clip-type mobile terminal, including a case forming an exterior of the mobile terminal, a display panel disposed on a front part of the case, and a battery disposed on a rear part of the case, wherein the case comprises a first frame supporting the display panel, a second frame supporting the battery and a connecting frame connecting one side of the first frame and one side of the second frame to each other and wherein the first frame and the second frame are disposed in a manner of leaving a space in-between by a predetermined gap.

The first frame, the second frame and the connecting frame may configure a single body.

The one side of the first frame and the one side of the second frame may be closed by the connecting frame, the other side of the first frame and the other side of the second frame may be open externally, and a first gap between the one side of the first frame and the one side of the second frame may be equal to a second gap between the other side of the first frame and the other side of the second frame.

The clip-type mobile terminal may further include a circuit module configured to activate the display panel by being installed on an outer surface of the connecting frame.

The clip-type mobile terminal may further include a frame cover covering edge regions of the first frame, the second frame and the connecting frame and the circuit module and the frame cover may include a first opening exposing the display panel and a second opening exposing the battery.

In this case, a fixing rib configured to fix the circuit module may be disposed on the frame cover by being projected from an inner surface of the frame cover confronting the circuit module.

The clip-type mobile terminal may further include a finger clip configured to sense deformations of the first and second frames by being connected to the circuit module and the connecting frame.

In this case, the finger clip may include a first clip configured to come in contact with the frame and a rear surface of the circuit module, a second clip configured to be connected to the first clip and come in contact with the second frame and a front surface of the circuit module, a first projection configured to be projected and disposed on the first clip and connect the first frame and the first clip to each other electrically, and a second projection configured to be projected and disposed on the second clip and connect the second frame and the second clip to each other electrically.

In some cases, instead of the first projection and the second projection, a first sensor and a second sensor are disposed to sense a presence or non-presence of a contact between the finger clip and the frame.

In the clip-type mobile terminal, at least one perforated hole may be formed in one side of at least one of the first frame and the second frame.

At least one sensor may be disposed on a region having the perforated hole formed therein, the sensor may be exposed through the perforated hole, and the sensor may recognize a presence or non-presence of attachment of the case by sensing a space between the first frame and the second frame.

Advantageous Effects

Effects of a mobile terminal according to the present invention are described as follows.

According to at least one of embodiments of the present invention, as a first frame supporting a display panel and a second frame supporting a battery are disposed to be spaced apart from each other in a predetermined distance, a clip type of U-shape is provided. Therefore, a user simply places a mobile terminal on various parts of a user' body, an object and the like and is able to carry the mobile terminal stably and conveniently.

According to at least one of embodiments of the present invention, by recognizing whether the clip-type mobile terminal is mounted in a manner of disposing a sensor in a space between a first frame supporting a display panel and a second frame supporting a battery, a mobile terminal automatically performs a prescribed operation, thereby providing a user with convenience.

According to at least one of embodiments of the present invention, by recognizing a presence or non-presence of an electric connection between a finger clip and a frame in a manner of disposing a projection on the finger clip configured to connect a circuit module and a frame to each other, a mobile terminal performs a prescribed operation, thereby providing a user with convenience.

Additional range of applicability of the present invention will become clear from the detailed description of the invention in the following. Yet, since it will be apparent to those skilled in the art that various modifications and variations can be made therein without departing from the spirit and scope of the invention, it is to be understood that the following detailed description of the present invention and a specific embodiment such as a preferred embodiment of the present invention are exemplary and explanatory.

DESCRIPTION OF DRAWINGS

FIG. 2 is a diagram of a mobile terminal according to one embodiment of the present invention.

FIG. 11 and FIG. 12 are diagrams of a frame cover configuring a case shown in FIG. 2.

FIG. 26A and FIG. 26B are diagrams of a finger clip configured to sense deformation of a frame.

BEST MODE FOR INVENTION

Figure 1:
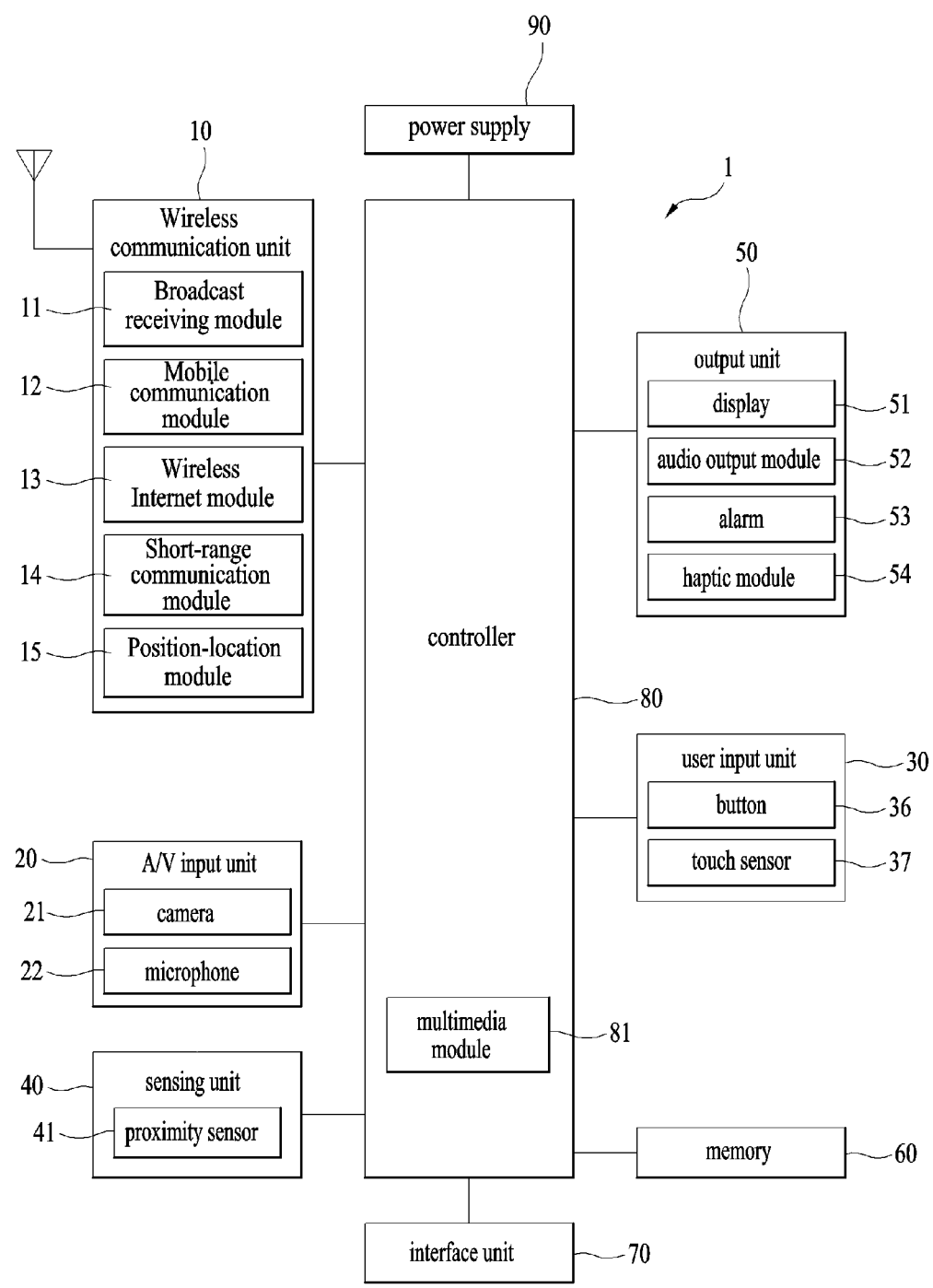
FIG. 1 is a block diagram of a mobile terminal according to one embodiment of the present invention.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a term such as "module" and "unit" may be used to refer to elements or components. Use of such a term herein is merely intended to facilitate description of the specification, and the term itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first ($1^{st}$), second ($2^{nd}$), etc. may be used herein to describe various elements, and these elements should not be limited by these terms. These terms are generally only used to distinguish one element from another.

It will be understood that when an element is referred to as being "connected with" or "accessed by" another element, the element can be directly connected with or accessed by the other element or intervening elements may also be present. In contrast, when an element is referred to as being "directly connected with" or "directly accessed by" another element, there are no intervening elements present.

A singular representation may include a plural representation unless it represents a definitely different meaning from the context.

Terms such as "comprise", "include" or "have" are used herein and should be understood that they are intended to indicate an existence of several components, functions or steps, disclosed in the specification, and it is also understood that greater or fewer components, functions, or steps may likewise be utilized. Moreover, due to the same reasons, it is also understood that the present application includes a combination of features, numerals, steps, operations, components, parts and the like partially omitted from the related or involved features, numerals, steps, operations, components and parts described using the aforementioned terms unless deviating from the intentions of the disclosed original invention.

Mobile terminals presented herein may be implemented using a variety of different types of terminals. Examples of such terminals may include cellular phones, smart phones, laptop computers, digital broadcast terminals, personal digital assistants (PDAs), portable multimedia players (PMPs), navigators, slate PCs, tablet PCs, ultrabooks, wearable devices (for example, smart watches, smart glasses, head mounted displays (HMDs)), and the like.

By way of non-limiting example only, further description will be made with reference to particular types of mobile terminals. However, such teachings apply equally to other types of stationary terminals such as digital TVs, desktop computers, digital signage players and the like.

FIG. 1 is a block diagram of a mobile terminal according to one embodiment of the present invention.

A mobile terminal 1 may include components such as a wireless communication unit 10, an input unit 20, a sensing unit 40, an output unit 50, an interface unit 70, a memory 60, a controller 80, a power supply unit 90 and the like. It is appreciated that implementing all of the components shown in FIG. 1 is not a requirement, and that greater or fewer components may alternatively be implemented.

In particular, among the above-listed components, the wireless communication unit 10 typically includes one or more modules which permit communications such as wireless communications between the mobile terminal 1 and a wireless communication system, communications between the mobile terminal 1 and another mobile terminal, communications between the mobile terminal 1 and an external server. Further, the wireless communication unit 10 typically includes one or more modules which connect the mobile terminal 1 to one or more networks.

The wireless communication unit 10 may include one or more of a broadcast receiving module 11, a mobile communication module 12, a wireless Internet module 13, a short-range communication module 14, and a location information module 15.

The input unit 20 includes a camera 21a for an image or video signal input, a microphone 22 (or an audio input unit) for an audio signal input, and a user input unit 30 (e.g., a touch key, a push key (or mechanical key), etc.) for receiving an input of information from a user. Audio or image data collected by the input unit 20 may be analyzed and processed into user's control command.

The sensing unit 40 is typically implemented using one or more sensors configured to sense internal information of the mobile terminal 1, the surrounding environment of the mobile terminal 1, user information, and the like. For example, the sensing unit 40 may include a proximity sensor 41 and an illumination sensor. If desired, the sensing unit 14 may alternatively or additionally include other types of sensors or devices, such as a touch sensor, an acceleration sensor, a magnetic sensor, a gravity sensor (G-sensor), a gyroscope sensor, a motion sensor, an RGB sensor, an infrared (IR) sensor, a finger scan sensor, a ultrasonic sensor, an optical sensor (for example, the camera 21), the microphone 22, a battery gauge, an environment sensor (for example, a barometer, a hygrometer, a thermometer, a radiation detection sensor, a thermal sensor, and a gas sensor, etc.), and a chemical sensor (for example, an electronic nose, a health care sensor, a biometric sensor, etc.), to name a few. The mobile terminal 1 disclosed in the present specification may be configured to utilize information obtained from at least two of the above-listed sensors.

The output unit 50 is typically configured to output various types of information, such as audio, video, tactile output, and the like. The output unit 50 may include at least one of a display unit 51, an audio output unit 52, a notification unit 53, a haptic module 54, and an optical output module. The display unit 51 may have an inter-layered structure or an integrated structure with a touch sensor in order to facilitate a touchscreen. The touchscreen may provide an output interface between the mobile terminal 1 and a user, as well as function as the user input unit 30 which provides an input interface between the mobile terminal 1 and the user.

The interface unit 70 serves as an interface with various types of external devices that can be coupled to the mobile terminal 1. The interface unit 70, for example, may include any of wired or wireless ports, external power supply ports, wired or wireless data ports, memory card ports, ports for connecting a device having an identification module, audio input/output (I/O) ports, video I/O ports, earphone ports, and the like. The mobile terminal 1 may perform assorted control functions associated with a connected external device, in response to the external device being connected to the interface unit 70.

Moreover, the memory 60 is typically implemented to store data to support various functions or features of the mobile terminal 1. The memory 60 may be configured to store application programs (or applications) run in the mobile terminal 1, data or instructions for operations of the mobile terminal 1, and the like. Some of these application programs may be downloaded from an external server via wireless communication. Other application programs may be installed on the mobile terminal 1 at time of manufacturing or shipping, which is typically the case for basic functions of the mobile terminal 1 (for example, receiving a call, placing a call, receiving a message, sending a message, etc.). It is common for application programs to be stored in the memory 60, installed on the mobile terminal 1, and launched by the controller 80 to perform operations (or functions) of the mobile terminal 1.

The controller 80 typically functions to control overall operations of the mobile terminal 1, in addition to the operations associated with the application programs. The controller 80 may provide or process information or functions appropriate for a user by processing signals, data, information and the like, which are inputted or outputted by the various components depicted in the above description, or running application programs stored in the memory 60.

Moreover, in order to launch an application program stored in the memory 60, the controller 80 can control at least one portion of the components described with reference to FIG. 1. Furthermore, the controller 80 controls at least two of the components included in the mobile terminal 1 to be activated in combination to launch the application program.

The power supply unit 90 can be configured to receive external power or provide internal power in order to supply appropriate power required for operating elements and components included in the mobile terminal 1. The power supply unit 90 may include a battery. In particular, the battery may include at least one of a built-in battery or a replaceable (or detachable) battery.

At least some of the components can operate cooperatively to implement the operations, controls or controlling methods of the mobile terminal 1 according to various embodiments mentioned in the following description. And, the operation, control or controlling method of the mobile terminal 1 may be implemented on the mobile terminal 1 by launching at least one application program saved in the memory 60.

Thus, the above-configured mobile terminal is provided with an exterior of a U-shaped clip type having a space between the display panel and the battery, thereby being conveniently attached to or mounted on various parts of user's body or other objects.

FIG. 2 is a diagram of a mobile terminal according to one embodiment of the present invention, in which front, rear, lateral, top and bottom surfaces of the mobile terminal are illustrated.

Referring to FIG. 2, a mobile terminal may include a case 100 forming an exterior, a display panel 200 disposed on a front part 100*b* of the case 100, and a battery 300 disposed on a rear part 100*c* of the case 100.

The front part 100*b* and the rear part 100*c* of the case 100 can be connected by a connecting part 100*a* of the case 100.

In this case, as the connecting part 100*a* of the case 100 can connect one side of the front part 100*b* of the case 100 and one side of the rear part 100*c* of the case 100 to each other, the front part 100*b* of the case 100 and the rear part 100*c* of the case 100 can be disposed in a manner of leaving a space 150 through a predetermined gap in-between.

The connecting part 100*a*, the front part 100*b* and the rear part 100*c* of the case 100 can be integrated into a single body.

Yet, in some cases, the connecting part 100*a*, the front part 100*b* and the rear part 100*c* of the case 100 may be separated from each other or assembled together.

One side of the front part 100*b* of the case 100 and one side of the rear part 100*c* of the case 100 may be closed by the connecting part 100*a* of the case 100. And, the other side of the front part 100*b* of the case 100 and the other side of the rear part 100*c* of the case 100 may be open externally.

A second gap d2 between one side of the front part 100*b* of the case 100 and one side of the rear part 100*c* of the case 100 and a first gap d1 between the other side of the front part 100*b* of the case 100 and the other side of the rear part 100*c* of the case 100 may be equal to each other.

Yet, in some cases, the first gap d1 and the second gap d2 may be different from each other.

For instance, each of the first gap d1 and the second gap d2 may correspond to 0.5~30 mm approximately.

A circuit module for driving the display panel 200 may be further included in the connecting part 100*a* of the case 100.

For instance, an ear jack 510 is disposed on one side of the circuit module, while a power key is disposed on the other side.

Figure 3A:
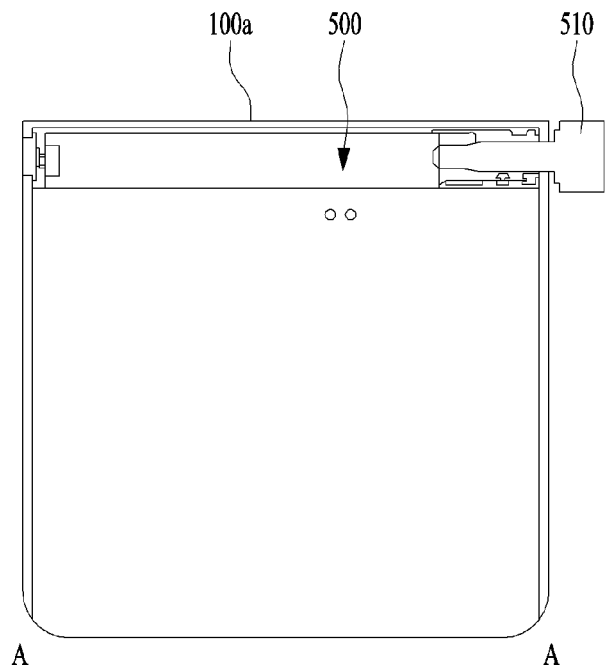
FIG. 3A is a cross-sectional diagram according to a line A-A shown in FIG. 2.

FIG. 3A is a cross-sectional diagram according to a line A-A shown in FIG. 2. And, FIG. 3B is a cross-sectional diagram according to a line B-B shown in FIG. 2.

Figure 3B:
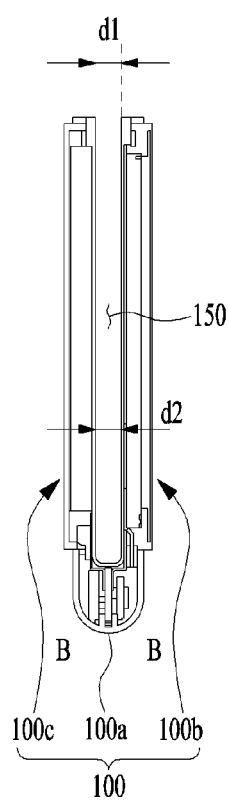
FIG. 3B is a cross-sectional diagram according to a line B-B shown in FIG. 2.

Referring to FIG. 3A and FIG. 3B, a circuit module 500 for driving a display panel can be disposed at the connecting part 100*a* of the case 100.

For instance, an ear jack 510 can be disposed on one side of the circuit module 500 and a power key can be disposed on the other side.

As the connecting part 100*a* of the case 100 can connect one side of the front part 100*b* of the case 100 and one side of the rear part 100*c* of the case 100 to each other, the front part 100*b* of the case 100 and the rear part 100*c* of the case 100 can be disposed in a manner of leaving a space 150 through a predetermined gap in-between.

In particular, one side of the front part 100*b* of the case 100 and one side of the rear part 100*c* of the case 100 may be closed by the connecting part 100*a* of the case 100. And, the other side of the front part 100*b* of the case 100 and the other side of the rear part 100*c* of the case 100 may be open externally.

A second gap d2 between one side of the front part 100*b* of the case 100 and one side of the rear part 100*c* of the case 100 and a first gap d1 between the other side of the front part 100*b* of the case 100 and the other side of the rear part 100*c* of the case 100 may be equal to each other.

For instance, each of the first gap d1 and the second gap d2 may correspond to 0.5~30 mm approximately.

Figure 4A:
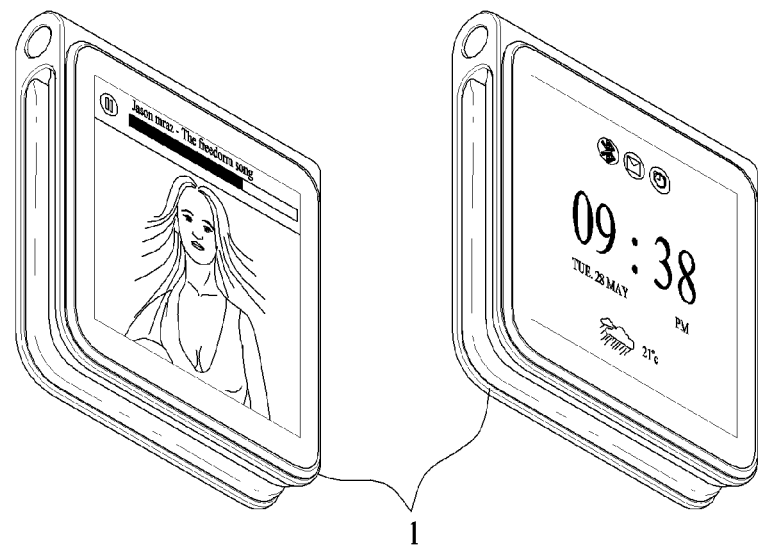
FIG. 4A and FIG. 4B are perspective diagrams for an exterior of a mobile terminal according to one embodiment of the present invention.
Figure 4B:
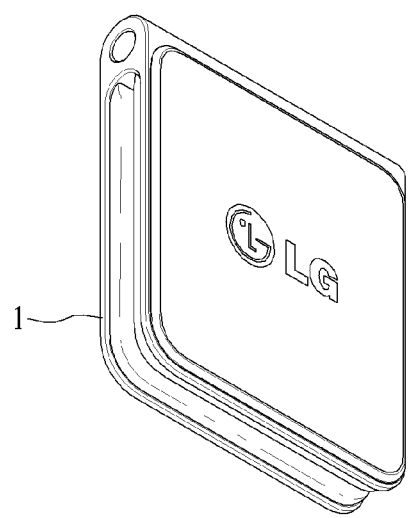

FIG. 4A and FIG. 4B are perspective diagrams for an exterior of a mobile terminal according to one embodiment of the present invention. FIG. 4A is a front perspective diagram and FIG. 4B is a rear perspective diagram.

Referring to FIG. 4A and FIG. 4B, a display panel may be disposed on a front part of a mobile terminal 1 and a battery may be disposed on a rear part of the mobile terminal 1.

On the display panel, the mobile terminal 1 can display various informations such as time, weather and the like as well as play music, photos, video and the like.

As the front part having the display panel disposed thereon and the rear part having the battery disposed thereon are disposed in a manner of leaving a space in-between by a predetermined gap, the mobile terminal 1 can have a clip shape.

Figure 5A:
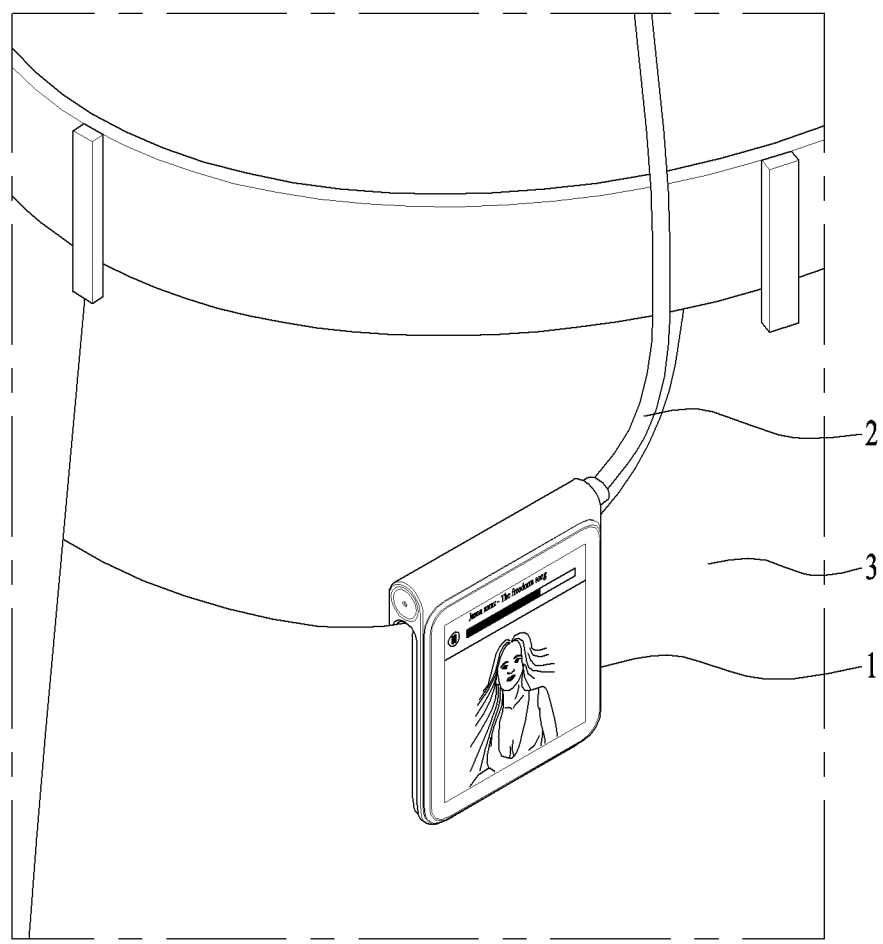
FIG. 5A and FIG. 5B are diagrams of a clip-type mobile terminal attached or clipping to a trouser pocket.
Figure 5B:
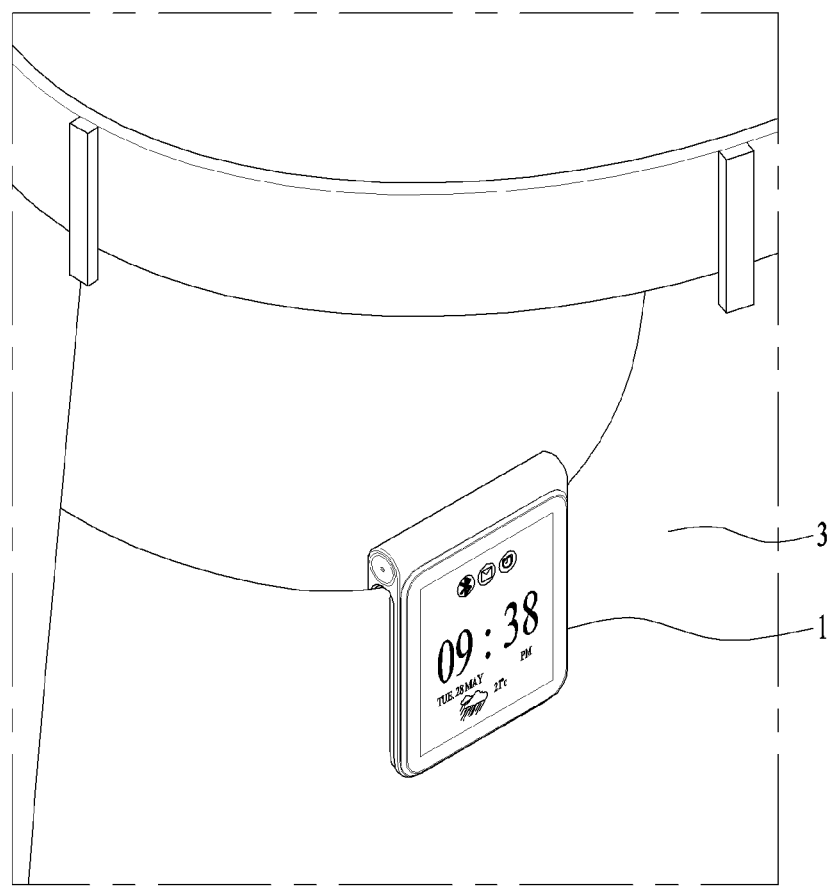

FIG. 5A and FIG. 5B are diagrams of a clip-type mobile terminal attached or clipping to a trouser pocket. FIG. 5A is a diagram to describe that music is played as an earphone is connected to an ear jack of the mobile terminal. FIG. 5B is a diagram to describe that various informations such as time, weather and the like are displayed without a connection of an earphone.

Referring to FIG. 5A and FIG. 5B, the mobile terminal of the present invention has a clip type of a U-shape and can be conveniently carried in a manner of being attached to or held on various parts of a user body.

For instance, when the mobile terminal is attached to a trouser pocket of a user, a rear part of the mobile terminal can be disposed to face an inside of the trouser pocket, while a front part of the mobile terminal is disposed to face an outside of the trouser pocket.

As a prescribed sensor is disposed in a space between the front part and the rear part of the mobile terminal, if the trouser pocket is inserted in the space between the front and rear parts of the mobile terminal, the sensor of the mobile terminal recognizes the attachment of the mobile terminal and may be then able to drive the mobile terminal automatically.

In particular, although the user does not activate the mobile terminal separately, if the attachment of the mobile terminal is confirmed in accordance with a sensing signal of the sensor, the mobile terminal runs various preset user interfaces or initial operation, by which the mobile terminal is non-limited.

Figure 6:
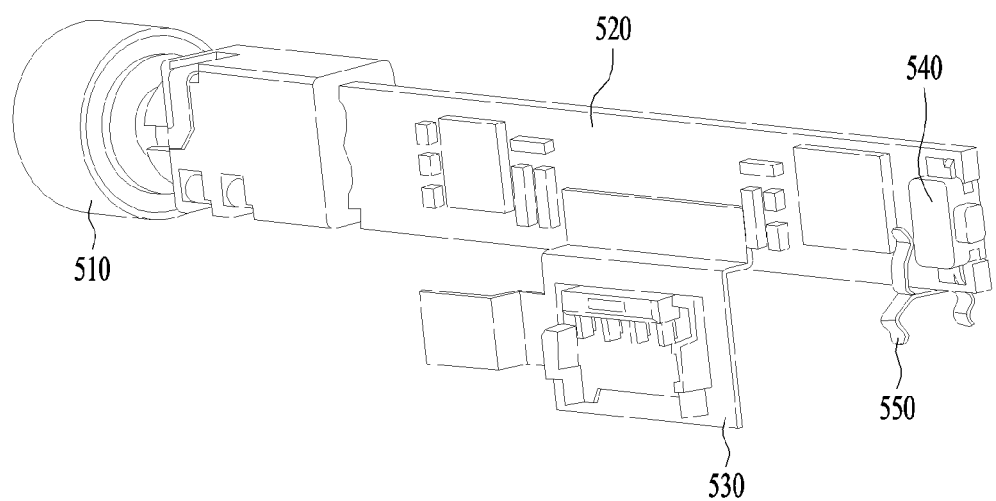
FIG. 6 is a perspective diagram of a circuit module disposed on a case connecting part shown in FIG. 2.

FIG. 6 is a perspective diagram of a circuit module disposed on the case connecting part shown in FIG. 2.

Referring to FIG. 6, a circuit module 500 may include a board 520, a first connector (not shown in the drawing), a second connector 530, an ear jack 510, and a power key 540.

In this case, the board 520 can be installed in a direction vertical to an outer surface of a connecting frame disposed within a case connecting part.

The first connector (not shown in the drawing) is disposed on a front surface of the board 520 and can be electrically connected to a display panel.

The second connector 530 is disposed on a rear surface of the board 520 and can be electrically connected to a battery.

The jack 510 for a connection to an external earphone may be disposed on one side of the board 520 and the power key 540 may be disposed on the other side of the board 520.

Additionally, a finger clip 550 for sensing deformation of a frame by being connected to the connecting frame may be further included in the circuit module 500.

Besides, the circuit module 500 may further include various kinds of additional elements such as a microphone, a proximity sensor and the like.

Figure 7:
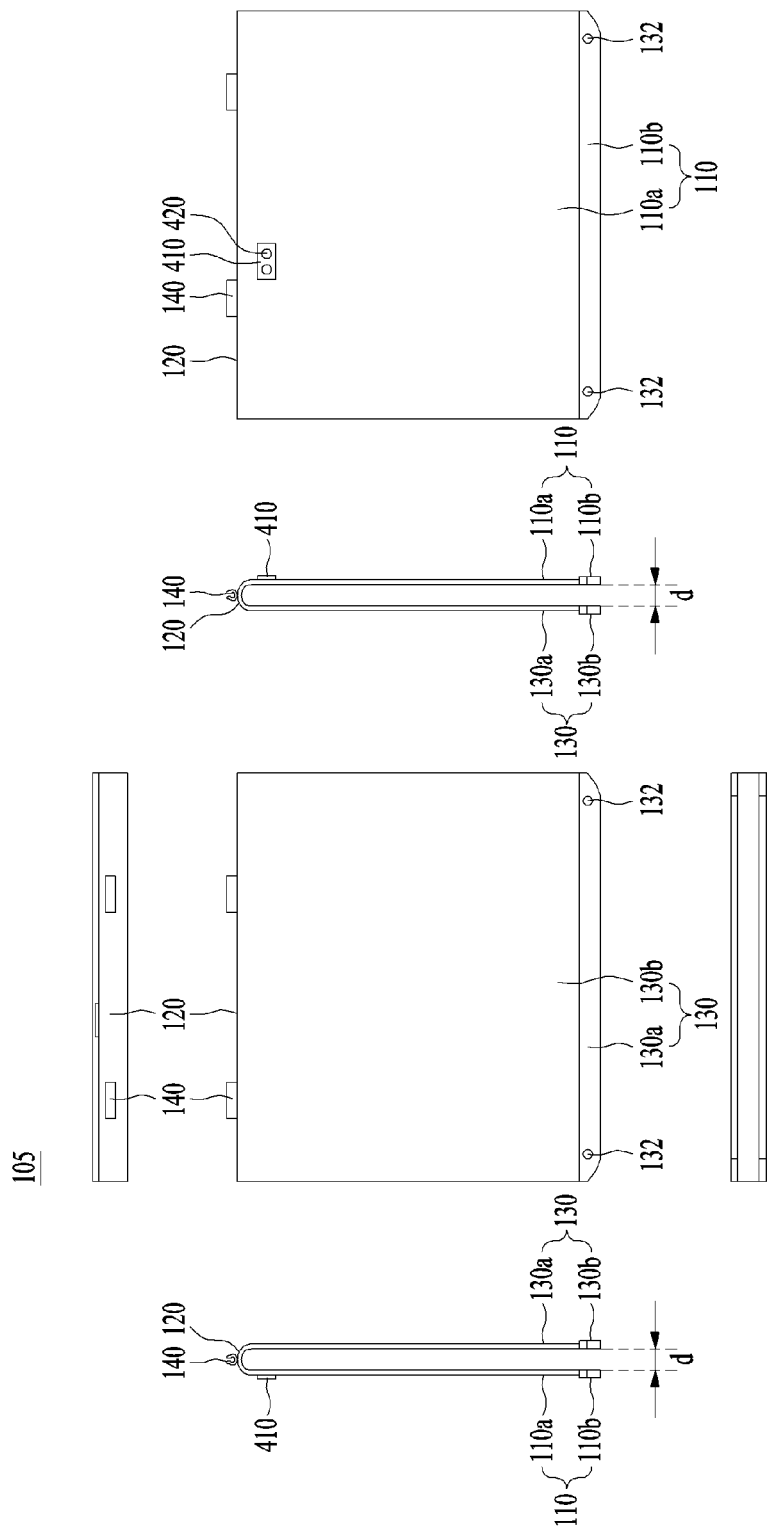
FIG. 7 is a perspective diagram of a frame disposed in a case shown in FIG. 2.

FIG. 7 is a perspective diagram of a frame disposed in a case shown in FIG. 2.

Referring to FIG. 7, a frame 105 in a case may include a first frame 130 supporting a display panel, a second frame 110 supporting a battery, and a connecting frame 120 connecting one side of the first frame 130 and one side of the second frame 110 to each other.

In this case, the first frame 130 and the second frame 100 may be disposed in a manner of leaving a space in-between by a predetermined gap d.

The first frame 130, the second frame 110 and the connecting frame 120 may be integrally formed into a single body.

Yet, the first frame 130, the second frame 110 and the connecting frame 120 may be separated from each other or assembled together.

The gap d between the first frame 130 and the second frame 110 may correspond to 0.5~30 mm approximately.

One side of the first frame 130 and one side of the second frame 110 may be closed by the connecting frame 120. The other side of the first frame 130 and the side of the second frame 110 may be externally open.

In this case, a first gap between one side of the first frame 130 and one side of the second frame 110 may be equal to a second gap between the other side of the first frame 130 and the other side of the second frame 110.

Yet, a first gap between one side of the first frame 130 and one side of the second frame 110 may be different from a second gap between the other side of the first frame 130 and the other side of the second frame 110.

At least one fixing clip 140 may be disposed on an outer surface of the connecting frame 120. By the fixing clip 140, the connecting frame 120 and the circuit module may be coupled with each other.

In particular, the board of the circuit module may be coupled by the at least one fixing clip 140 projected from the outer surface of the connecting frame 120.

A pad 410 may be disposed on one of the first frame 130 and the second frame 110.

In this case, the pad 410 is a shock-absorbing member for the prevention of shock applied to a sensor and may be disposed to correspond to the sensor.

In particular, the pad 410 may be disposed between the sensor and the frame 105. And, a hole 420 for exposure of the sensor may be formed in the pad 140.

In doing so, a perforated hole in the same size of the hole 420 may be disposed in a region of the frame 105 corresponding to the hole 420 of the pad 410.

For instance, at least one perforated hole may be formed in one side of at least one of the first and second frames 130 and 110.

In the perforated hole formed region, at least one sensor can be disposed. The sensor is exposed through the perforated hole and is able to recognize whether the case is attached by sensing the space between the first and second frames 130 and 110.

Hence, the sensor can be exposed in the space between the first frame 130 and the second frames 110 through the perforated hole of the frame 105.

Moreover, a body region 130*a* of the first frame 130 and a body region 110*a* of the second frame 110 are formed of a first material, and an edge region 130*b* of the first frame 130 and an edge region 110*b* of the second frame 110 may be formed of a second material.

In this case, the first material and the second material may be different from each other.

For instance, the first material may include a metal material and the second material may include a resin material.

If the edge regions 130*b* and 110*b* of the first and second frames 130 and 110 are formed not of the metal material but of the resin material, when the mobile terminal is attached or held, it is able to prevent the attached or held region from being damaged by friction between an end portion 105 of the frame 105 and the attached or held region.

Hence, the edge regions 130*b* and 110*b* of the first and second frames 130 and 110 may be formed by molding.

And, the body regions 130*a* and 110*a* of the first and second frames 130 and 110 are formed of the metal material, thereby preventing the mobile terminal from being deformed by external shock.

Moreover, at least one coupling hole 132 may be formed in each of the edge regions 130*b* and 110*b* of the first and second frames 130 and 110.

Figure 8:
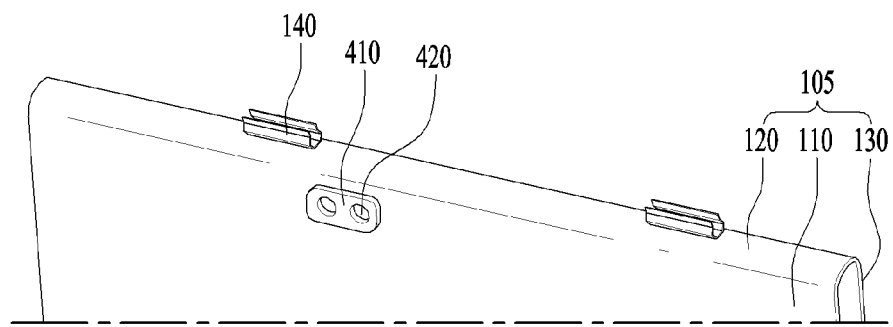
FIG. 8 and FIG. 9 are diagrams of a fixing clip shown in FIG. 7.
Figure 9:
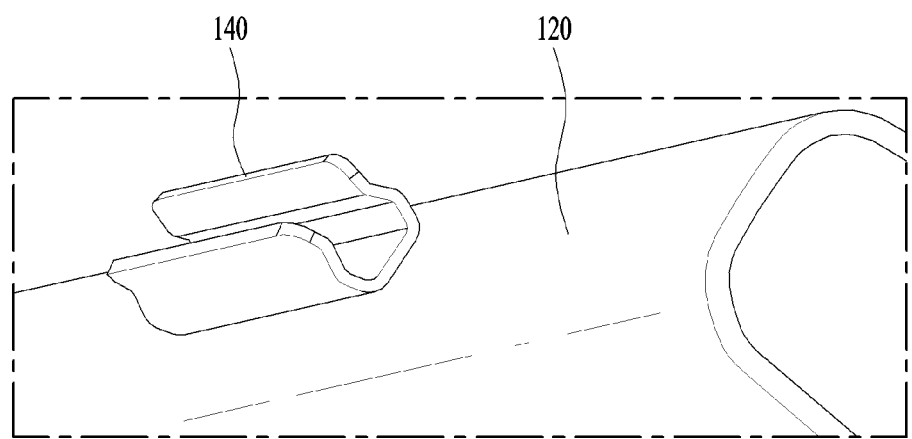

FIG. 8 and FIG. 9 are diagrams of a fixing clip shown in FIG. 7.

Referring to FIG. 8 and FIG. 9, a frame 105 may include a first frame 130 supporting a display panel, a second frame 110 supporting a battery, and a connecting frame 120 connecting one side of the first frame 130 and one side of the second frame 110 to each other. And, at least one fixing clip 140 may be disposed on an outer surface of the connecting frame 120.

In this case, the fixing clip 140 can couple the connecting frame 120 and a circuit module with each other by fixing a board of the circuit module.

For instance, the fixing clip 140 can be prepared in one of various shapes. According to the present invention, the fixing clip 140 may have a clip shape of 'U'.

In this case, in the fixing clip 140, a space size of a region adjacent to the connecting frame 120 may be greater than that of a region distant from the connecting frame 120.

A pad 410 may be disposed on one of the first frame 130 and the second frame 110. In this case, the pad 410 is a shock-absorbing member for the prevention of shock applied to a sensor and may be disposed to correspond to the sensor.

In particular, the pad 410 may be disposed between the sensor and the frame 105. And, a hole 420 for exposure of the sensor may be formed in the pad 140.

Figure 10A:
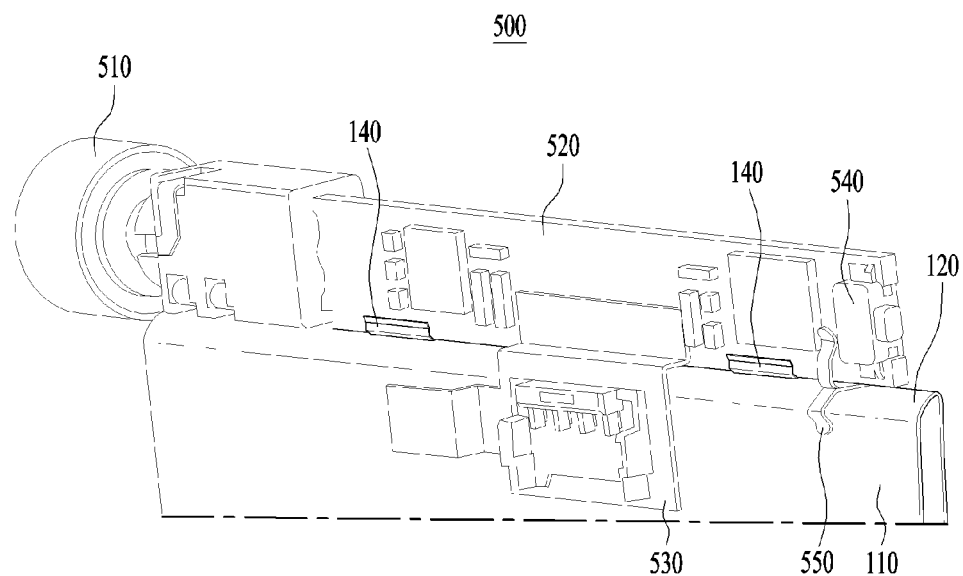
FIG. 10A and FIG. 10B are diagrams to illustrate a coupling between a circuit module and a frame.
Figure 10B:
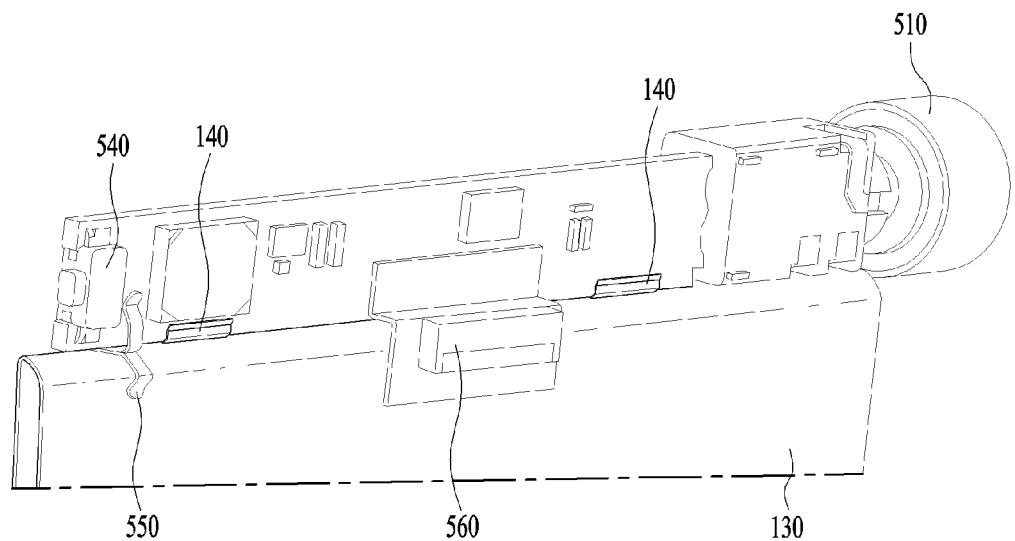

FIG. 10A and FIG. 10B are diagrams to illustrate a coupling between a circuit module and a frame. FIG. 10A is a rear diagram of coupling and FIG. 10B is a rear diagram of coupling.

Referring to FIG. 10A and FIG. 10B, a circuit module 500 may be installed in a direction vertical to an outer surface of a connecting frame 120.

In this case, a board 520 of the circuit module 500 may be coupled by a fixing clip 140 disposed on the outer surface of the connecting frame 120.

In particular, in order to fix the board 520 of the circuit module 500 stably, a multitude of fixing clips 140 may be disposed.

In the circuit module 500 installed on the fixing clip 140, an ear jack 510 for connection to an external earphone may be disposed on one side of the board 520 and a power key 540 may be disposed on the other side.

A first connector 560 of the circuit module 500 is disposed on a first frame 130 to facilitate electrical connection to a display panel. A second connector 530 of the circuit module 500 is disposed on a second frame 110 to facilitate electrical connection to a battery.

A top side of the finger clip 550 is connected to the board 520 of the circuit module 500 and a bottom of the finger clip 550 is connected to the connecting frame 120, whereby deformation of a frame can be sensed.

In this case, the finger clip 550 may include a first clip configured to come in contact with the first frame 130 and a rear surface of the circuit module 500, a second clip configured to come in contact with the second frame 110 and a front surface of the circuit module 500 by being connected to the first clip, a first projection electrically connecting the first frame 130 and the first clip together by being projected and disposed on the first clip, and a second projection electrically connecting the first frame 130 and the second clip together by being projected and disposed on the second clip.

In some cases, the finger clip may include a first sensor sensing a presence or non-presence of a contact between the first frame 130 and the first clip by being disposed on the first clip and a second sensor sensing a presence or non-presence of a contact between the second frame 120 and the second clip by being disposed on the second clip instead of including the first and second projections.

Thus, the mobile terminal runs various user interfaces depending on a presence or non-presence of an electrical connection to the finger clip 550 in accordance with frame deformation, thereby providing a user with various events.

Therefore, the user can launch a desired function conveniently and simply by deforming a frame of a mobile terminal with a small force instead of manipulating the mobile terminal complicatedly to launch a prescribed function.

Figure 12:
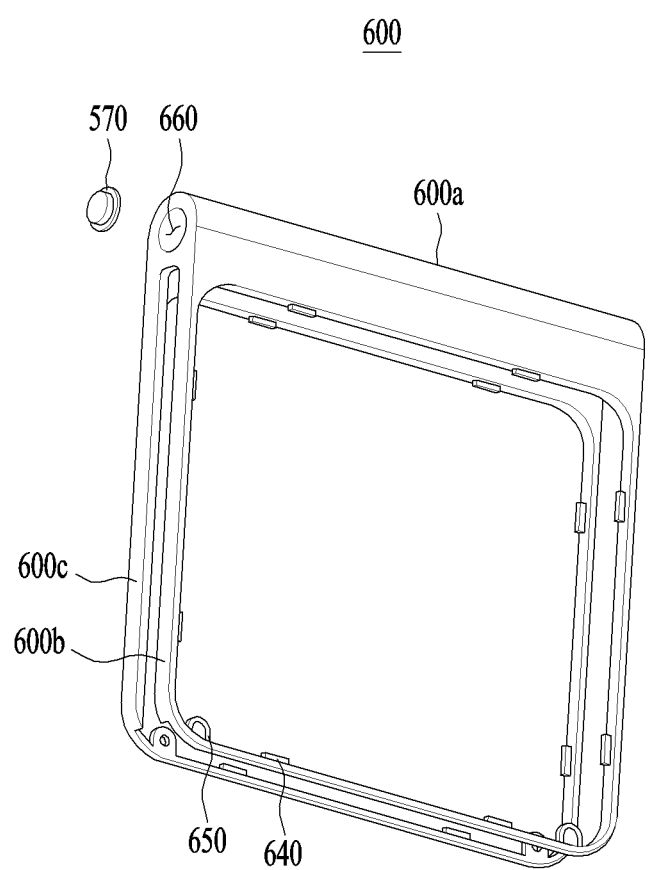

FIG. 11 and FIG. 12 are diagrams of a frame cover configuring a case shown in FIG. 2. FIG. 11 shows a front side, a rear side, a lateral side, a top side and a bottom side of a frame cover. And, FIG. 12 is a perspective diagram of a frame cover.

Referring to FIG. 11 and FIG. 12, a frame cover 600 can cover edge regions of a first frame, a second frame and a connecting frame and a circuit module.

In this case, the frame cover 600 may include a first opening 610 exposing a display panel and a second opening 620 exposing a battery.

A fixing rib 630 for fixing the circuit module by being projected from an inner surface confronting the circuit module may be disposed on the frame cover 600.

And, the frame cover 600 may include a first cover 600*b* covering the edge region of the first frame, a second cover 600*c* covering the edge region of the second frame and a connecting cover 600*a* covering the connecting frame.

In this case, the connecting cover 600*a* can connect one side of the first cover 600*b* and one side of the second cover 600*c* to each other.

The connecting cover 600*a* can protect the circuit module externally by covering the circuit module installed on the connecting frame.

The fixing rib 630 may be projected and disposed on an inner surface of the connecting cover 600*a*. The fixing rib 630 is coupled with a board of the circuit module, thereby being able to stably fixing the circuit module.

In this case, two fixing ribs 630 may be disposed in a length direction of the connecting cover 600*a* and the board of the circuit module may be inserted between the two fixing ribs 630.

A coupling hole 660 may be formed in one side of the connecting cover 600*a*. And, a power button 570 covering a power key may be inserted in the coupling hole 660 of the connecting cover 600*a*.

A multitude of hooks 640 and a multitude of bosses 650 may be disposed on a periphery of each of the first opening 610 and the second opening 620 in a manner of being projected inward.

In particular, the hook 640 disposed on the around the first opening 610 may be coupled with the panel cover covering a periphery of the display panel and the hook 640 disposed on the periphery of the second opening 620 may be coupled with a battery cover covering a front side of the battery.

The frame cover 600 may be embodied by molding. For instance, the frame cover 600 may be formed of a resin material.

Hence, the frame cover 600 is embodied into a clip type in U-shape. If a prescribed force is applied to the frame cover 600, the frame cover 600 may have flexible or bendable hardness.

Figure 13:
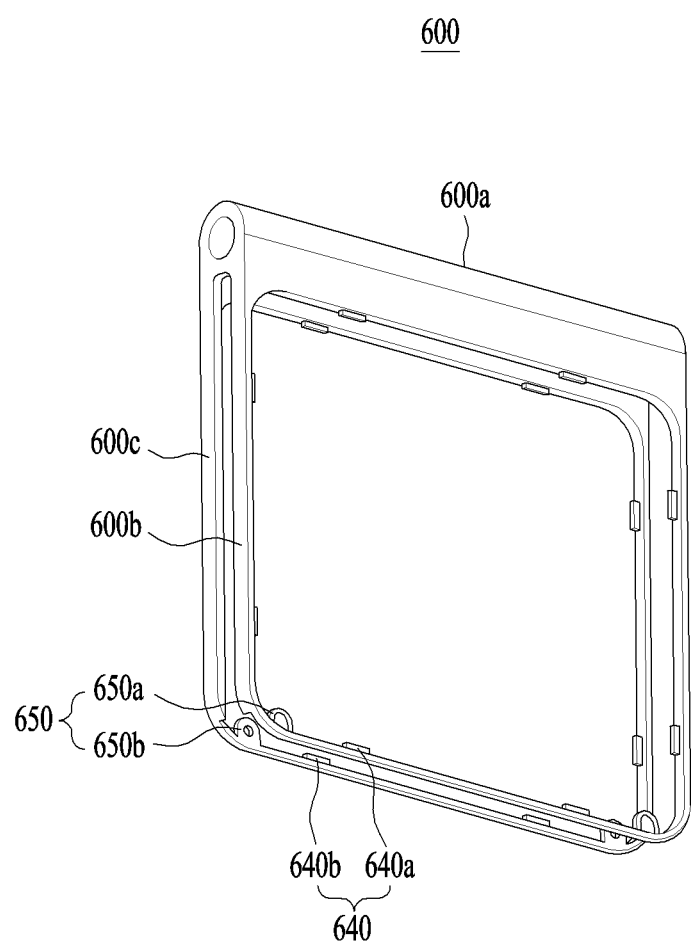
FIG. 13 is a perspective diagram of the disposition of a hook and a boss shown in FIG. 12.

FIG. 13 is a perspective diagram to illustrate the disposition of the hook and boss shown in FIG. 12.

Referring to FIG. 13, the frame cover 600 may include a first cover 600*b* having a first opening, a second cover 600*c* having a second opening, and a connecting cover 600*a* connecting the first cover 600*b* and the second cover 600*c* to each other.

In this case, a multitude of hooks 640 and a multitude of bosses 650 may be disposed on a periphery of each of the first and second openings in a manner of being projected inward.

The hooks 640 may include a first hook 640*a* disposed on the first cover 600*b* and a second hook 640*b* disposed on the second cover 600*c*. In particular, the first hook 640*a* disposed on the first cover 600*b* and the second hook 640*b* disposed on the second cover 600*c* can be disposed to confront each other correspondingly.

The bosses 650 may include a first boss 650*a* disposed on the first cover 600*b* and a second boss 650*b* disposed on the second cover 600*c*. In particular, the first boss 650*a* disposed on the first cover 600*b* and the second boss 650*b* disposed on the second cover 600*c* can be disposed to confront each other correspondingly.

Figure 14:
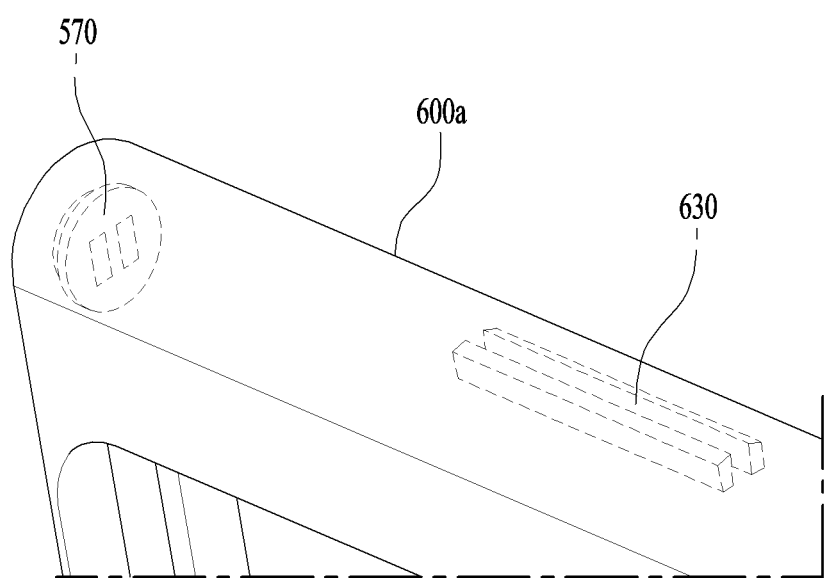
FIG. 14 is a diagram of a fixing rib shown in FIG. 12.

FIG. 14 is a diagram of a fixing rib shown in FIG. 12.

Referring to FIG. 14, on a connecting cover 600*a* of a frame cover, a fixing rib 630 for fixing a circuit module by being projected from an inner surface confronting the circuit module may be disposed.

In this case, the fixing rib 630 can stably fix the circuit module by being coupled with a board of the circuit module.

Hence, two fixing ribs 630 may be disposed in a length direction of the connecting cover 600*a*. The board of the circuit module can be coupled by being inserted between the two fixing ribs 630.

A coupling hole may be formed in one side of the connecting cover 600*a*. And, a power button 570 covering a power key may be inserted in the coupling hole of the connecting cover 600*a*.

Figure 15:
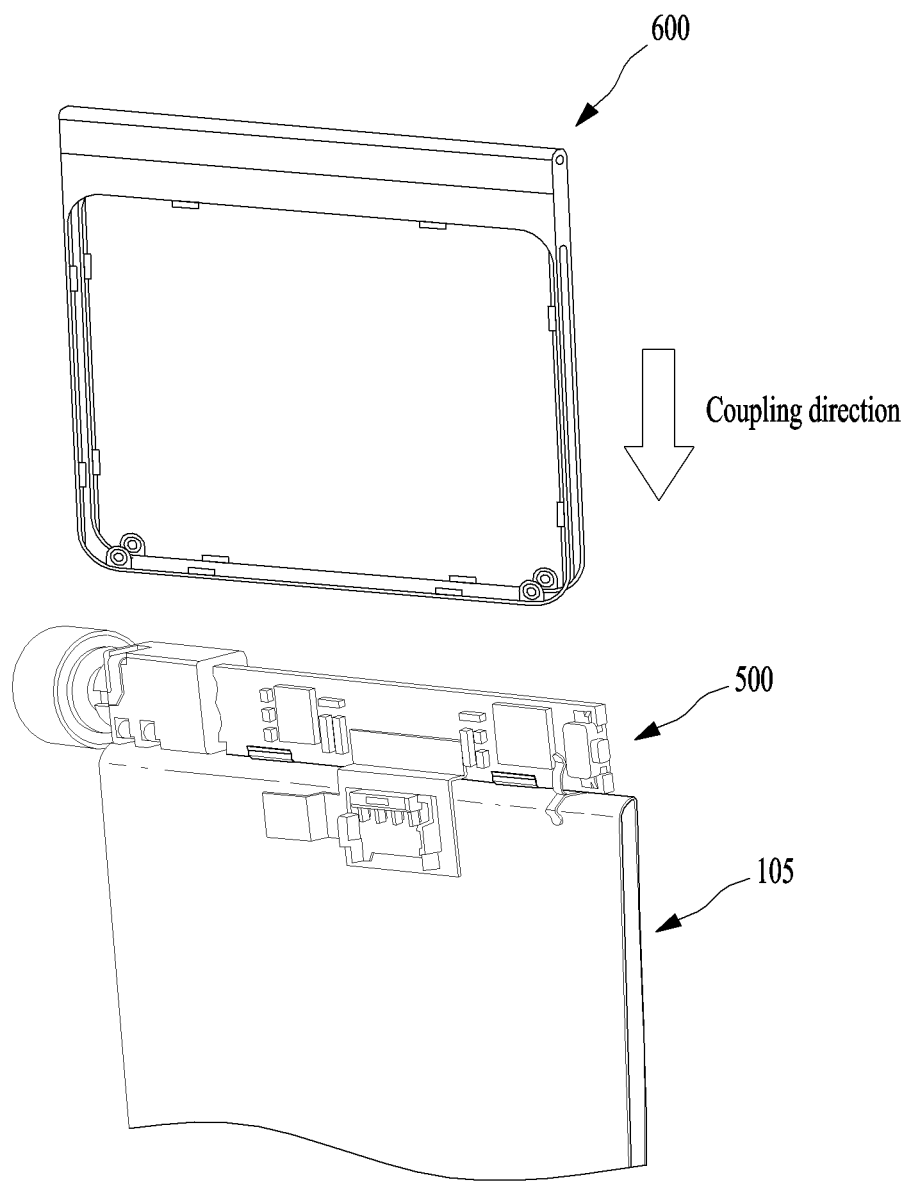
FIGS. 15 to 17 are diagrams to illustrate a coupling between a circuit module installed frame and a frame cover.
Figure 16:
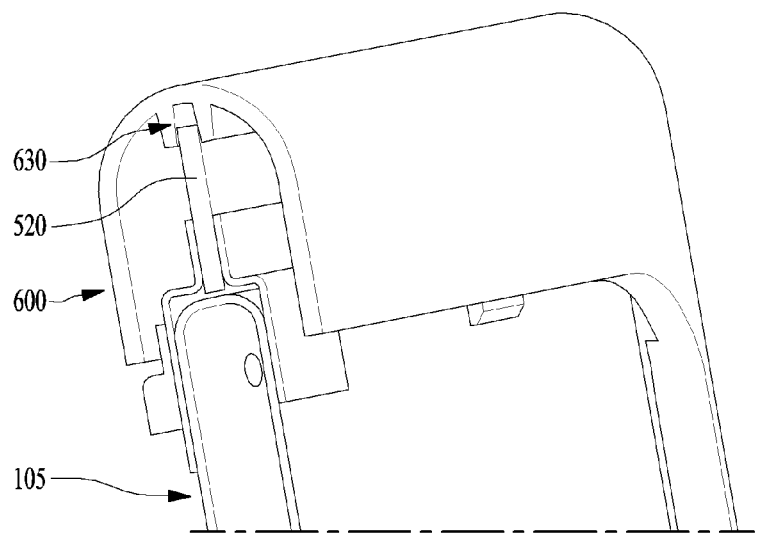
Figure 17:
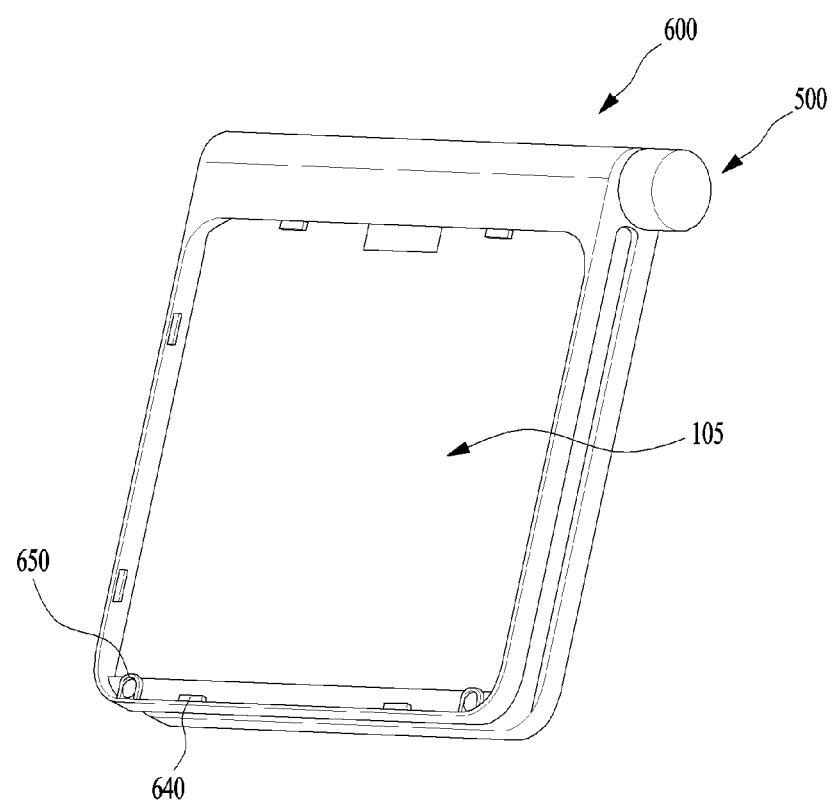

FIGS. 15 to 17 are diagrams to illustrate a coupling between a circuit module installed frame and a frame cover. FIG. 15 is a diagram to show a coupling direction, FIG. 16 is a diagram to show a coupled portion, and FIG. 17 is a diagram to show completion of the coupling.

Referring to FIGS. 15 to 17, a frame cover 600 is moved in a direction toward a disposed circuit module 500 in order to be coupled with a frame 105 having the circuit module 500 installed therein. In particular, the circuit module 500 is inserted in the frame cover 600 and the frame 105 can be then inserted in the frame cover 600.

A board 520 of the circuit module 500 can be coupled by being inserted in a fixing rib 630 of the frame cover 600.

Hence, the frame 105 is exposed through an opening of the frame cover 600 and the circuit module 500 can be inserted in the frame cover 600.

Figure 18:
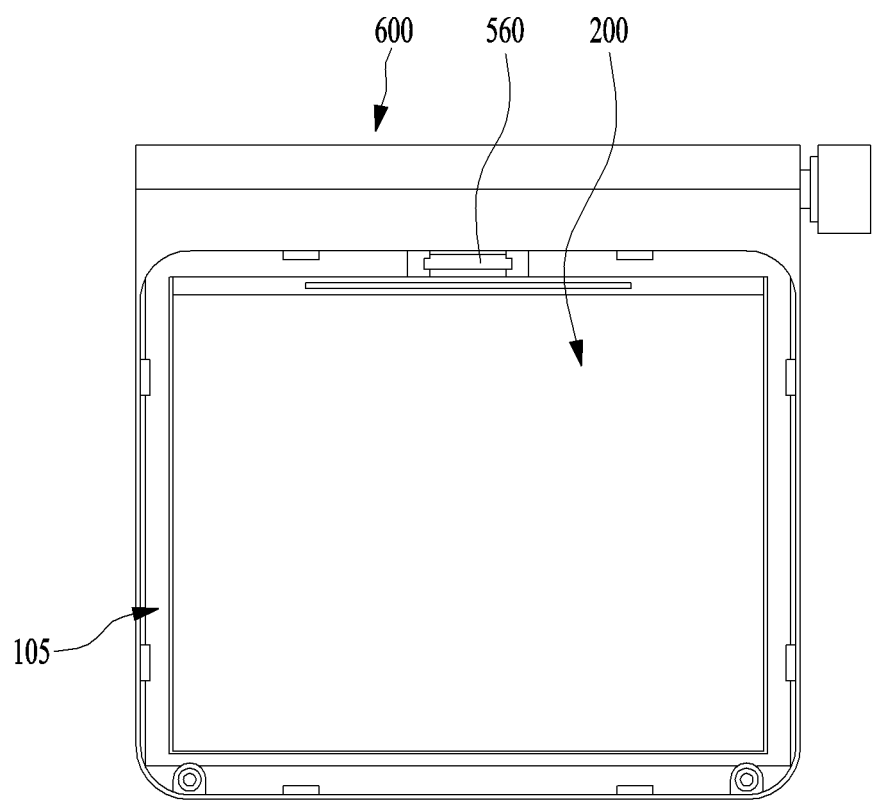
FIG. 18 is a diagram to illustrate an installation of a display panel.

FIG. 18 is a diagram to illustrate an installation of a display panel.

Referring to FIG. 18, a frame cover 600 is coupled with a frame 105. And, the frame 105 may be exposed through an opening of the frame cover 600.

In this case, a display panel 200 is installed in the opening of the exposed frame cover 600 and can be electrically connected to a first connector 560 of a circuit module.

For instance, the display panel 200 may be coupled using a zip connector or a B-to-B connector, by which the present invention is non-limited.

Figure 19:
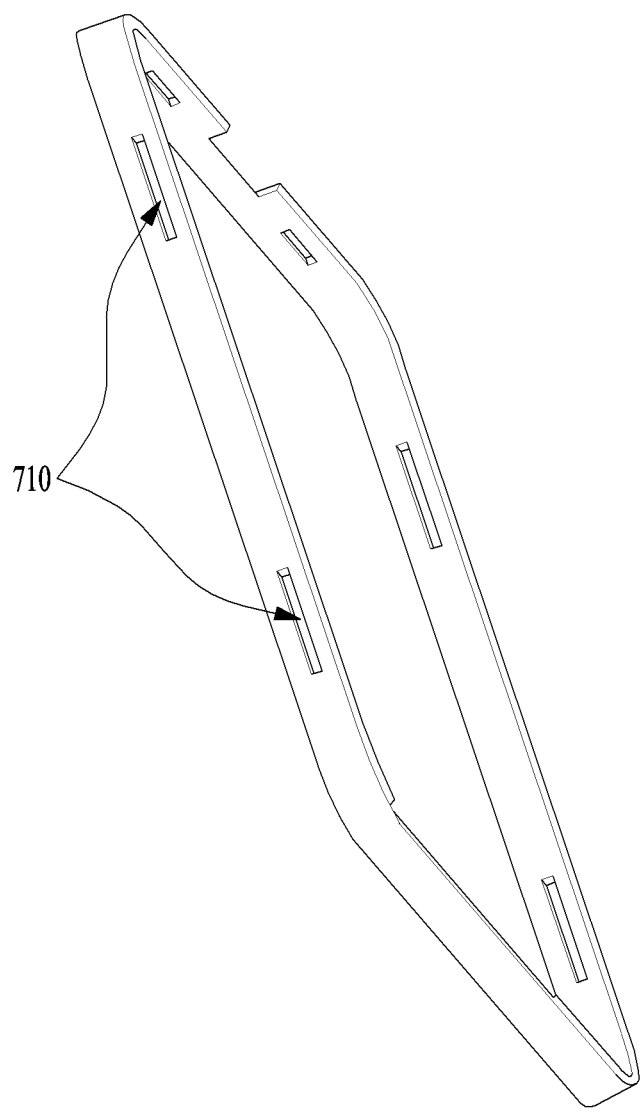
FIG. 19 is a diagram of a panel cover.
Figure 20A:
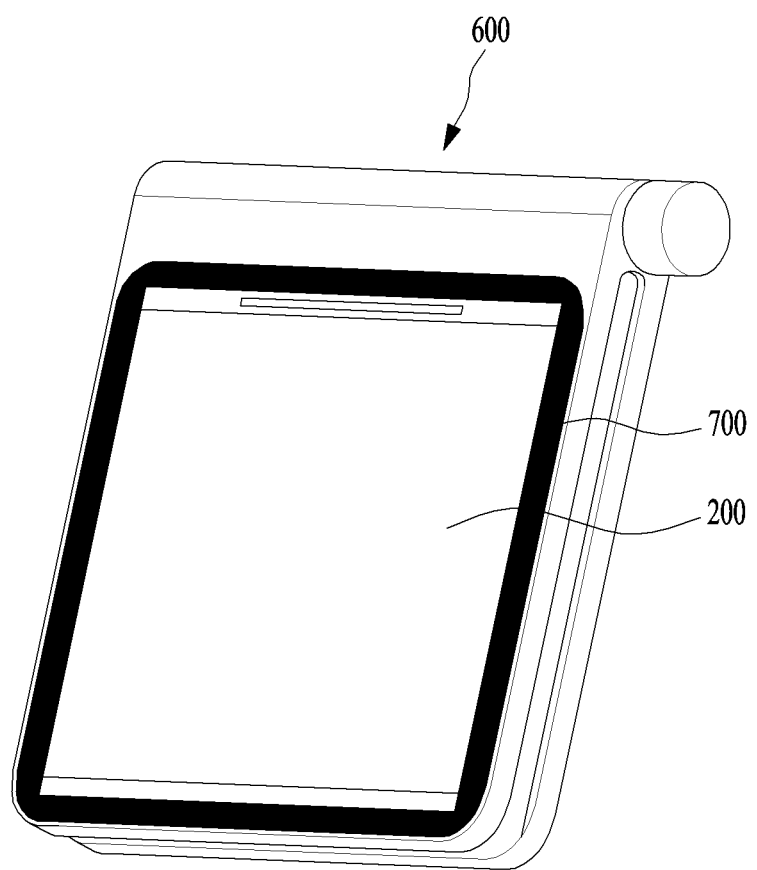
FIG. 20A and FIG. 20B are diagrams to illustrate a panel cover coupling.
Figure 22A:
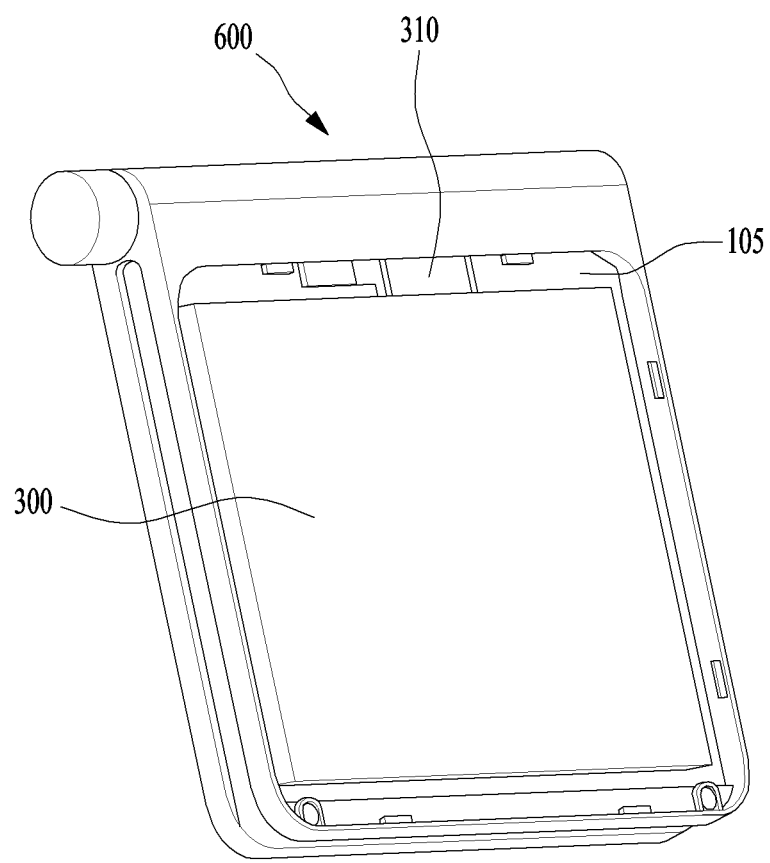
FIG. 22A and FIG. 22B is a diagram to illustrate a battery coupling.
Figure 22B:
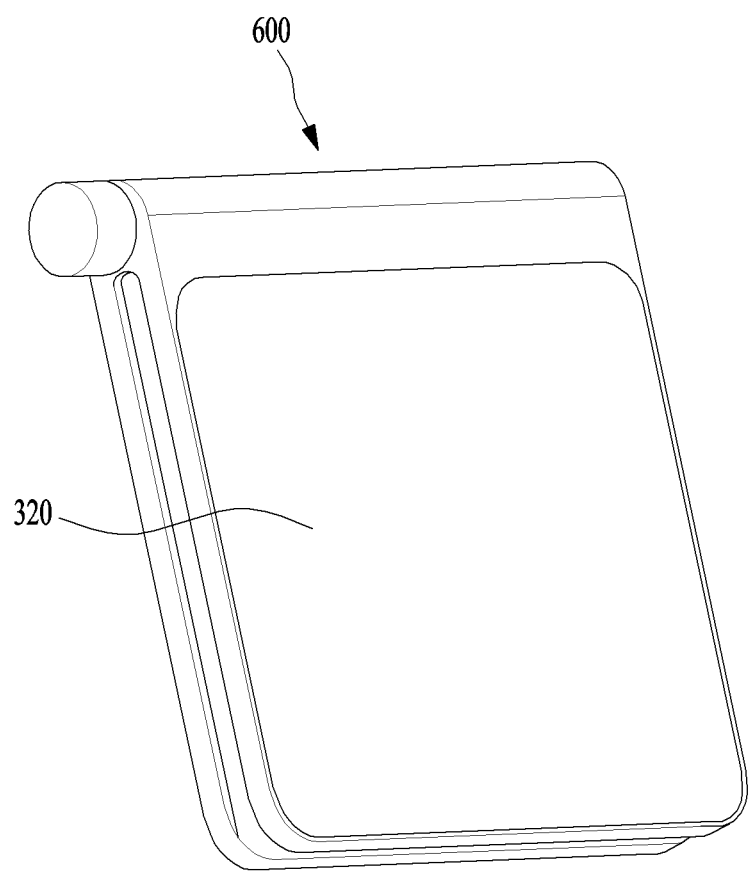

FIG. 19 is a diagram of a panel cover. FIG. 20A and FIG. 22B are diagrams to illustrate a panel cover coupling.

Referring to FIG. 19, a panel cover 700 can cover a periphery of a display panel by being coupled with a multitude of hooks of a frame cover.

In this case, a multitude of coupling holes 710 can be disposed on a lateral side of the panel cover 700. In particular, a multitude of the coupling holes 710 may be disposed in a manner of corresponding to the hooks of the frame cover.

Hence, the number of the coupling holes 710 of the panel cover 700 may be equal to that of the hooks of the frame cover.

The panel cover 700 has an opening that opens front and rear sides of its own, whereby the display panel can be exposed externally.

In this case, the panel cover 700 may be embodied by molding. For instance, the panel cover 700 may be formed of a resin material.

Referring to FIG. 20A, a panel cover 700 can cover a periphery of a display panel 200.

In this case, since the panel cover 700 can cover an exposed region of a frame cover 600 entirely by being disposed to enclose the periphery of the display panel 200, it is able to prevent external particles from entering the mobile terminal.

Figure 20B:
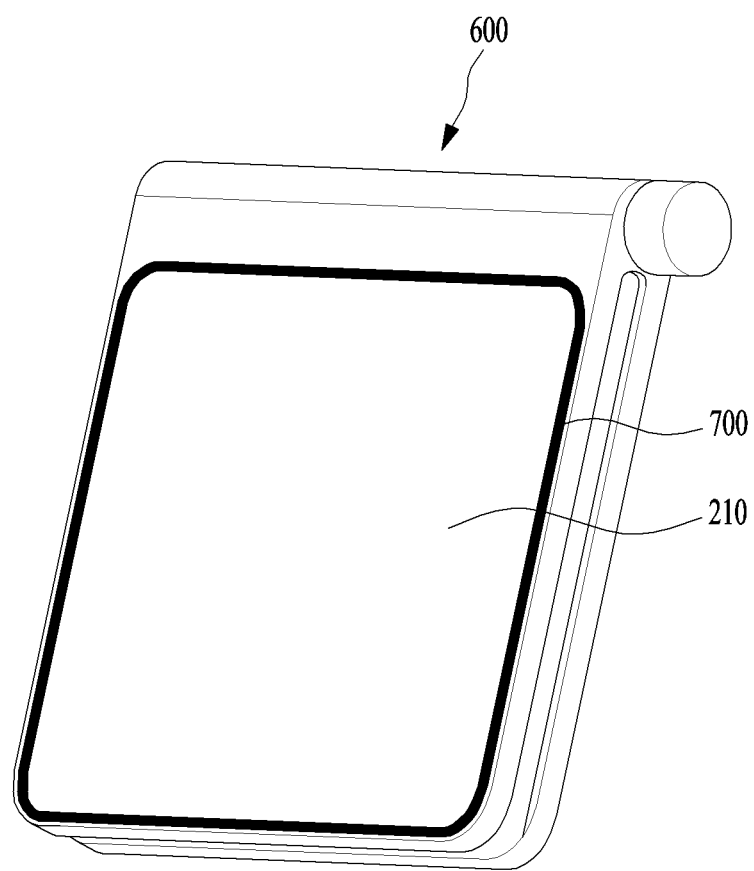

Referring to FIG. 20B, a protective window 210 may be attached to a front side of the display panel by taping or bonding.

In this case, the protective window 210 can protect the display panel from external shock.

Figure 21:
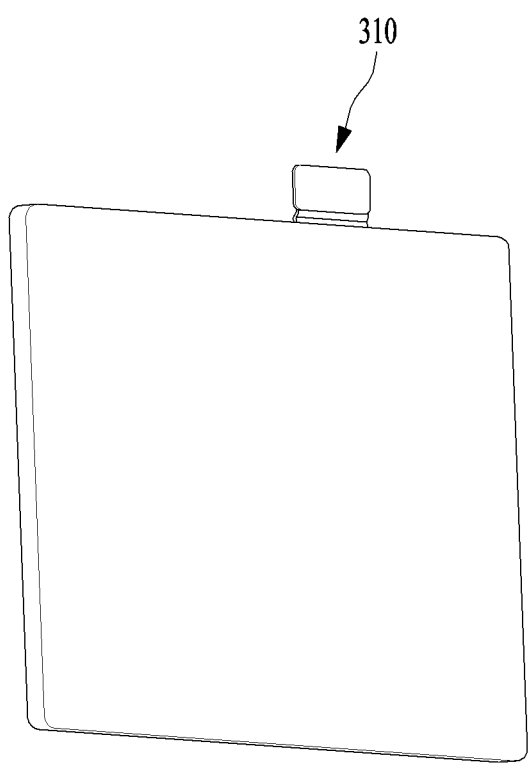
FIG. 21 is a diagram of a battery.

FIG. 21 is a diagram of a battery. FIG. 22A and FIG. 22B is a diagram to illustrate a battery coupling.

Referring to FIG. 21, a battery connector 310 for an electrical connection to a circuit module may be disposed on one side of a battery 300.

In this case, the battery connector 310 may be disposed at a location corresponding to a second connector of the circuit module in a manner of being externally projected from the one side.

Referring to FIG. 22A, a frame cover 600 is coupled with a frame 105. And, the frame 105 may be exposed through an opening of the frame cover 600.

The battery 300 is installed in the opening of the exposed frame cover 600, and a battery connector 310 of the battery 300 may be electrically connected to the second connector of the circuit module.

For instance, the battery 300 may be coupled by a connector type, by which the present invention is non-limited.

Referring to FIG. 22B, a battery cover 320 for battery protection may be installed on a top side of the battery.

In this case, the battery cover 320 can cover a front side of the battery by being coupled with a hook of a frame cover.

The battery cover 320 may be embodied by molding. For instance, the battery cover 320 may be formed of a resin material.

Hence, in some cases, the battery cover 320, the panel cover and the frame cover may be formed of the same material.

In other cases, the battery cover 320, the panel cover and the frame cover may be formed of different materials, respectively.

In other cases, the battery cover 320, the panel cover and the frame cover may be formed of a material different from that of the first frame, the second frame and the connecting frame.

Figure 23:
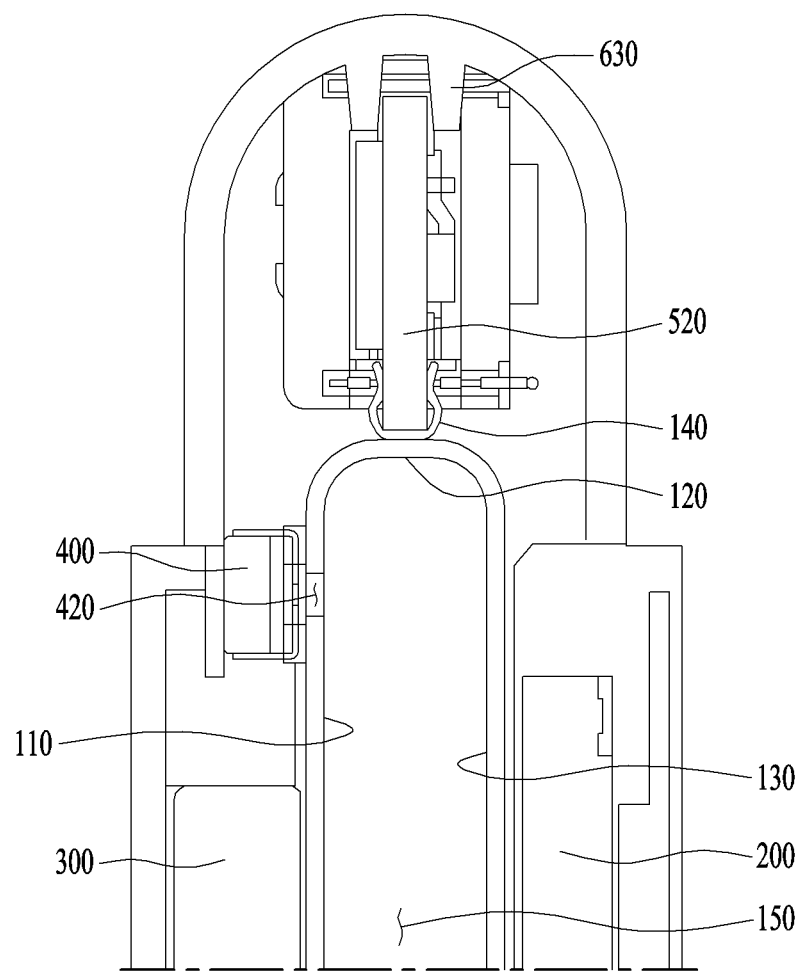
FIG. 23 is a diagram to illustrate a location of a sensor.

FIG. 23 is a diagram to illustrate a location of a sensor.

Referring to FIG. 23, a frame in a case may include a first frame 130 supporting a display panel 20, a second frame 110 supporting a battery 300 and a connecting frame 120 connecting one side of the first frame 130 and one side of the second frame 110 to each other.

In this case, the first frame 130 and the second frame 110 can be disposed in a manner of leaving a space 150 in-between by a predetermined gap.

At least one fixing clip 140 may be disposed on an outer surface of the connecting frame 120. By the fixing clip 140, the connecting frame 120 and one side of a board 520 of a circuit module can be coupled with each other.

The other side of the board 520 of the circuit module can be coupled by a fixing rib 630 of a frame cover 600.

Hence, one side of the board 520 of the circuit module is coupled with the fixing clip 140 of the connecting frame 120 and the other side of the board 520 of the circuit module is coupled with the fixing rib 630 of the frame cover 600, whereby the board 520 can be stably fixed.

At least one perforated hole 420 may be formed in one side of at least one of the first frame 130 and the second frame 110.

At least one sensor 400 can be disposed in a region in which the perforated hole 420 is formed. The sensor 400 is exposed through the perforated hole 420 and is able to recognize whether the case is attached or held by sensing the space 150 between the first frame 130 and the second frame 110.

For instance, the sensor 400 may include a proximity sensor, by which the present invention is non-limited.

In some cases, a pad may be disposed between the sensor 400 and one of the first and second frames 130 and 110.

A hole for exposure of the sensor 400 may be formed in the pad.

In this case, the pad is a shock-absorbing member for shock prevention of the sensor 400 and may be disposed to correspond to the sensor 400.

The reason for disposing the sensor 400 in the case is described as follows. First of all, by sensing the space 150 between the first frame 130 and the second frame 110, if an attachment portion is inserted in the space 150 between the first frame 130 and the second frame 110, the sensor 400 recognizes the attachment of the mobile terminal and is able to automatically drive the mobile terminal.

In particular, although a user does not activate the mobile terminal separately, the mobile terminal confirms an attachment of the mobile terminal in accordance with a sensing signal of the sensor 400 and then launches various user interfaces or an initial operation, by which the present invention is non-limited.

Figure 24:
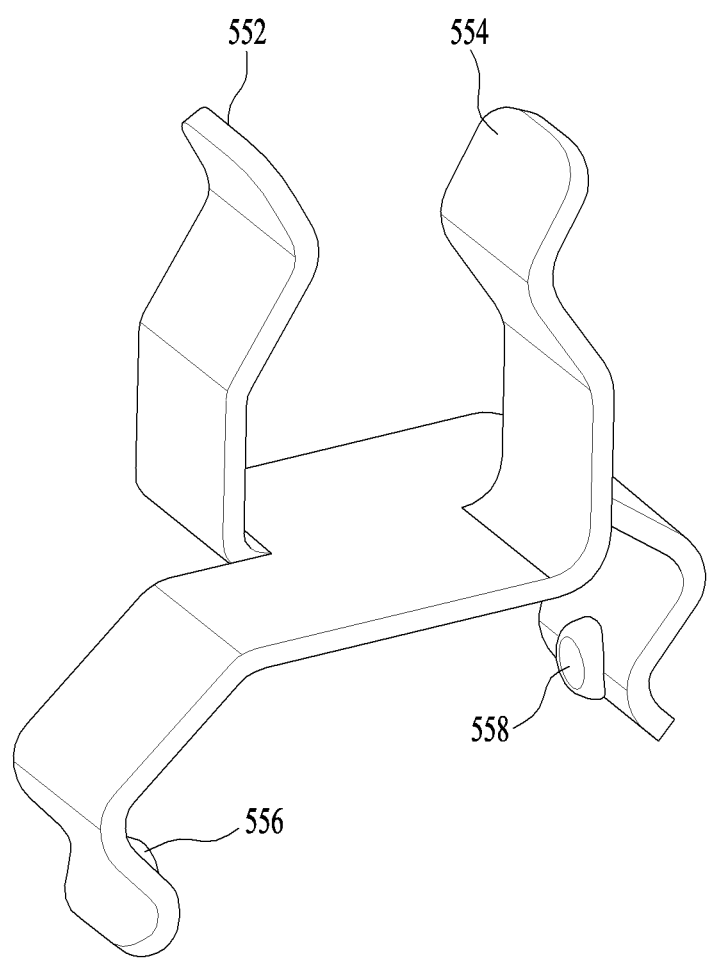
FIG. 24 is a diagram of a finger clip.
Figure 25:
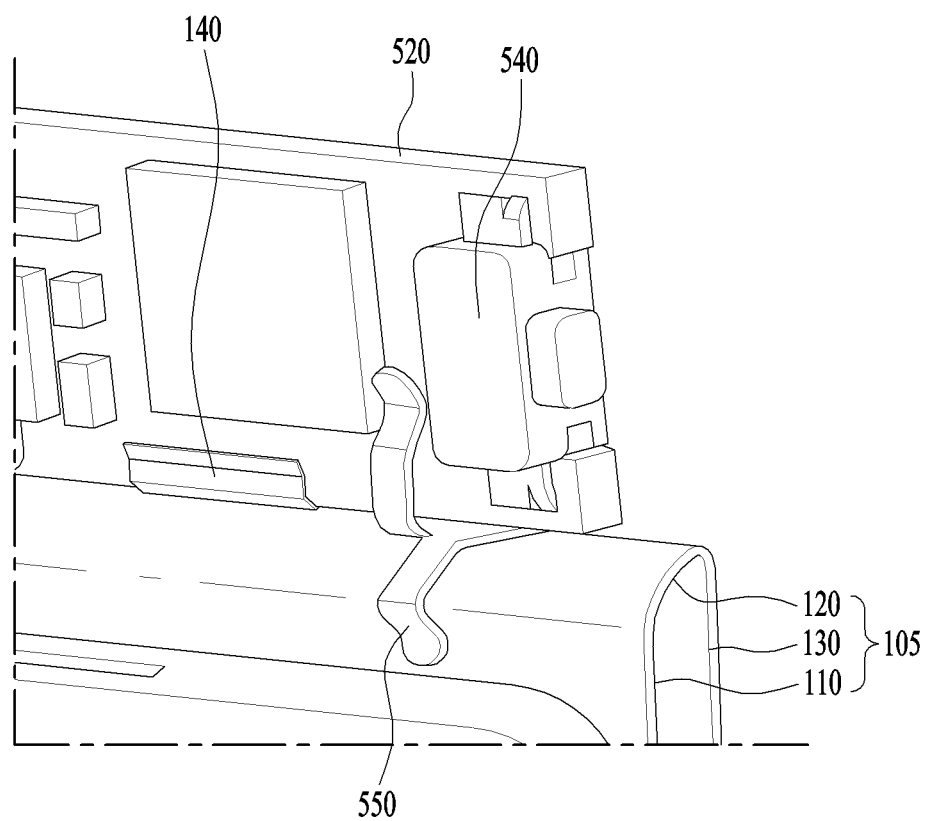
FIG. 25 is a diagram to illustrate an installation of a finger clip.

FIG. 24 is a diagram of a finger clip. FIG. 25 is a diagram to illustrate an installation of a finger clip.

Referring to FIG. 24 and FIG. 25, an upper part of a finger clip 550 is connected to a board 520 of a circuit module and a lower part of the finger clip 550 is connected to a frame 105 including a first frame 130, a second frame 120 and a connecting frame 120, whereby deformation of the frame can be sensed.

In this case, the finger clip 550 may be disposed between a power key 540 of the circuit module and a fixing rib 140 of the frame 105.

In particular, the finger clip 550 can be disposed on an edge region of the board 520 of the circuit module and an edge region of the frame 105.

The reason for this is described as follows. Since deformation of the frame 105 in the edge region of the frame is greater than that in a center region of the frame 105, the deformation of the frame 105 can be easily sensed.

And, the finger clip 550 may include a first clip 552, a second clip 554, a first projection 558, and a second projection 556.

In this case, the first clip 552 comes in contact with the first frame 130 and a rear surface of a circuit module and the second clip 554 may come in contact with the second frame 110 and a front surface of the circuit module.

The first projection 558 electrically connects the first frame 130 and the first clip 552 together by being projected and disposed on the first clip 552. The second projection 556 electrically connects the first frame 130 and the second clip 554 together by being projected and disposed on the second clip 554.

If the frame is deformed by an external force, as the finger clip 550 and the frame fail to come in contact with each other, an electrical connection between them is disconnected.

Thus, the mobile terminal runs various user interfaces depending on a presence or non-presence of an electrical connection to the finger clip 550 in accordance with frame deformation, thereby providing a user with various events.

In some cases, the finger clip may include a first sensor sensing a presence or non-presence of a contact between the first frame 130 and the first clip by being disposed on the first clip and a second sensor sensing a presence or non-presence of a contact between the second frame 120 and the second clip by being disposed on the second clip instead of including the first and second projections.

Therefore, the user can launch a desired function conveniently and simply by deforming a frame of a mobile terminal with a small force instead of manipulating the mobile terminal complicatedly to launch a prescribed function.

Figure 26B:
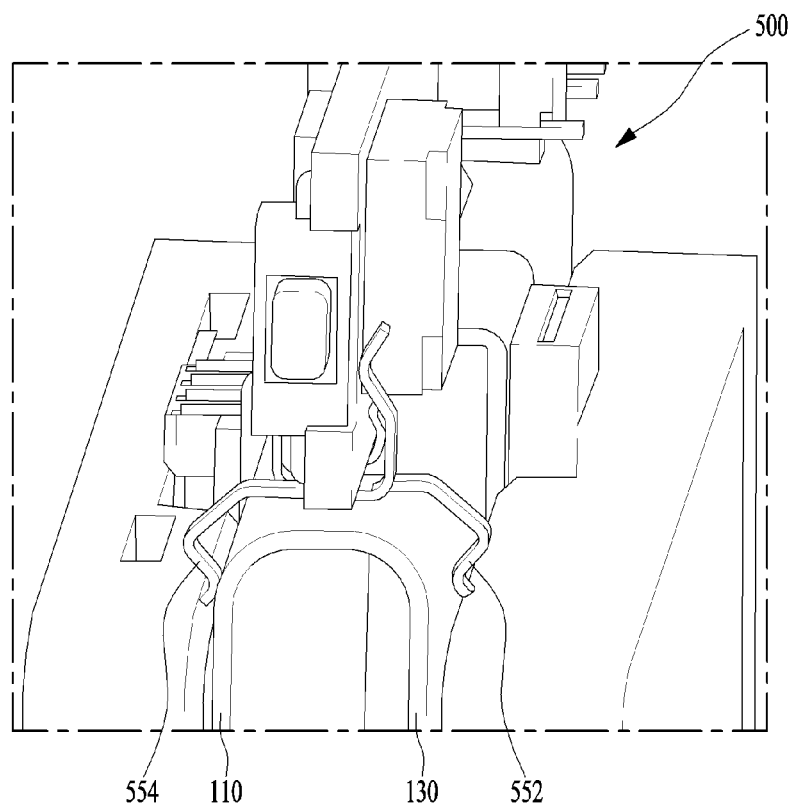
Figure 27:
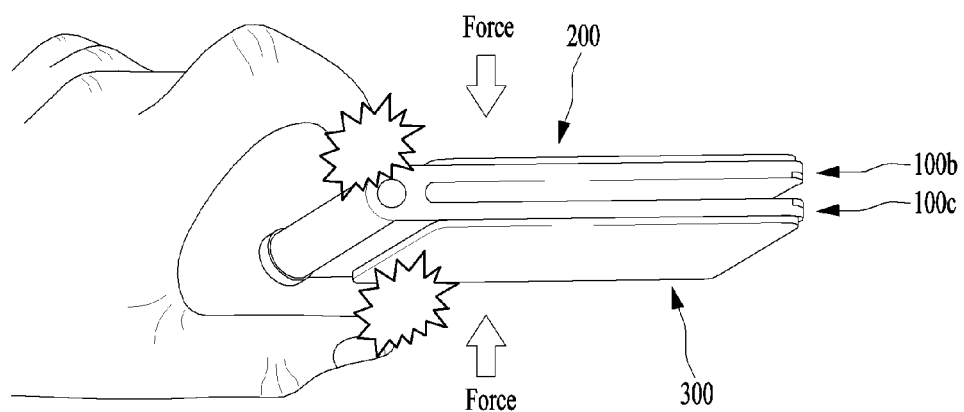
FIG. 27 is a diagram to illustrate a method of deforming a frame.

FIG. 26A and FIG. 26B are diagrams of a finger clip configured to sense deformation of a frame. FIG. 27 is a diagram to illustrate a method of deforming a frame.

Referring to FIG. 26A and FIG. 26B, an upper part of a finger clip 550 is connected to a circuit module 500 and a lower part of the finger clip 550 is connected to a frame including a first frame 130, a second frame 120 and a connecting frame 120, whereby deformation of the frame can be sensed.

If there is no deformation of the frame, as shown in FIG. 26A, the finger clip 550 can come in contact with both of the first frame 130 and the second frame 110.

Yet, if deformation of the frame occurs, as shown in FIG. 26B, the finger clip 550 is detached from at least one of the first and second frames 130 and 110, thereby failing to come in contact.

Hence, as an electrical connection or disconnection occurs in the first projection 558 and the second projection 556 of the finger clip 550 depending on a presence or non-presence of a contact between the finger clip 550 and the frame, the controller of the mobile terminal launches various user interfaces correspondingly, thereby providing various events to a user.

Referring to FIG. 27, in a mobile terminal, a display panel 200 is disposed on a front part 100b of a case and a battery is disposed on a rear part 100c of the case. If a user causes deformation to the frame by applying a force to the front part 100b and the rear part 100c of the case in the mobile terminal using two fingers, a finger clip 550 senses the deformation of the frame 105 and the mobile terminal then launches various user interfaces in accordance with the frame deformation sensed through the finger clip 550, whereby various events can be provided to the user.

Therefore, the user can launch a desired function conveniently and simply by deforming a frame of a mobile terminal with a small force instead of manipulating the mobile terminal complicatedly to launch a prescribed function.

Figure 28:
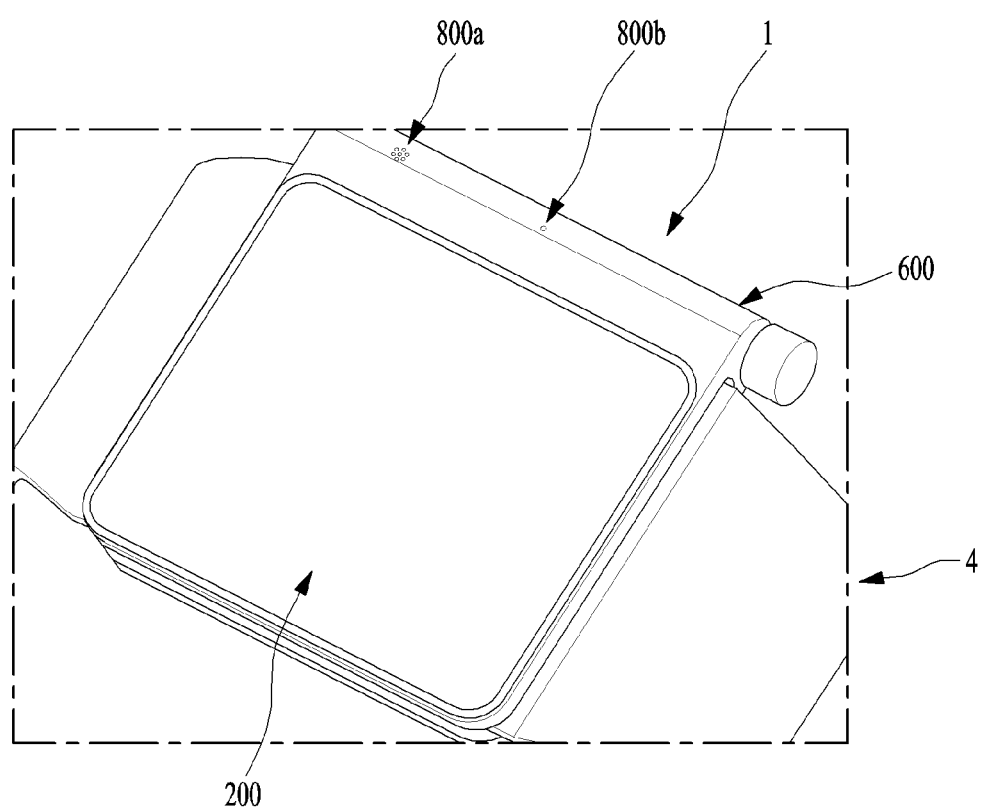
FIG. 28 is a diagram of a watch phone having a clip-type mobile terminal applied thereto.

FIG. 28 is a diagram of a watch phone having a clip-type mobile terminal applied thereto.

Referring to FIG. 28, if a mobile terminal 1 is mounted on a watch band 4, it can be used as a watch phone.

In a frame cover 600 of the mobile terminal 1, a first hole 800a capable of transmitting/receiving a remote signal in response to a remote manipulating device of a circuit module and a second hole 800b capable of transmitting/receiving an audio signal in response to a microphone device of the circuit module can be formed.

As the mobile terminal 1 can transmit/receive messages and communications, it is able to display various informations on a display panel 200.

Since the mobile terminal 1 can perform a short-range communication (e.g., Bluetooth, etc.) with another communication device and can be charged through an ear jack, the mobile terminal 1 can perform a mobile watch phone function.

Therefore, like the watch phone, the mobile terminal 1 of the clip type can be utilized for various functions depending on an attached or held portion.

Thus, according to the present invention, as a first frame supporting a display panel and a second frame supporting a battery are disposed to be spaced apart from each other in a predetermined distance, a clip type of U-shape is provided. Therefore, a user simply places a mobile terminal on various parts of a user' body, an object and the like and is able to carry the mobile terminal stably and conveniently.

According to the present invention, by recognizing whether the clip-type mobile terminal is mounted in a manner of disposing a sensor in a space between a first frame supporting a display panel and a second frame supporting a battery, a mobile terminal automatically performs a prescribed operation, thereby providing a user with convenience.

According to the present invention, by recognizing a presence or non-presence of an electric connection between a finger clip and a frame in a manner of disposing a projection on the finger clip configured to connect a circuit module and a frame to each other, a mobile terminal performs a prescribed operation, thereby providing a user with convenience.

MODE FOR INVENTION

A clip-type mobile terminal according to the present invention may be non-limited by the configurations and methods of the embodiments mentioned in the foregoing description. And, the embodiments mentioned in the foregoing description can be configured in a manner of being selectively combined with one another entirely or in part to enable various modifications.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

The present invention relates to a clip-type mobile terminal conveniently placed on various parts of a user body and other objects. Therefore, the present invention has industrial applicability.

What is claimed is:

1. A clip-type mobile terminal, comprising:
a case forming an exterior of the mobile terminal;
a display panel disposed on a front part of the case; and
a battery disposed on a rear part of the case,
wherein the case comprises a first frame supporting the display panel, a second frame supporting the battery and a connecting frame connecting one side of the first frame and one side of the second frame to each other,
wherein the first frame and the second frame are disposed in a manner of leaving a space in-between by a predetermined gap,
wherein a circuit module is configured to activate the display panel by being installed on an outer surface of the connecting frame, and
wherein the circuit module includes a board installed in a direction vertical to the outer surface of the connecting frame, a first connector electrically connected to the display panel, a second connector electrically connected to the battery, an ear jack disposed on one side of the board, and a power key disposed on the other side of the board.

2. The clip-type mobile terminal of claim 1, wherein the first frame, the second frame and the connecting frame configure a single body.

3. The clip-type mobile terminal of claim 1, wherein the gap between the first frame and the second frame comprises 0.5~30 mm.

4. The clip-type mobile terminal of claim 1, wherein the one side of the first frame and the one side of the second frame are closed by the connecting frame, wherein the other side of the first frame and the other side of the second frame are open externally, and wherein a first gap between the one side of the first frame and the one side of the second frame is equal to a second gap between the other side of the first frame and the other side of the second frame.

5. The clip-type mobile terminal of claim 1, wherein the circuit module is coupled with at least one fixing clip projected from the outer surface of the connecting frame.

6. The clip-type mobile terminal of claim 1, further comprising a frame cover covering edge regions of the first frame, the second frame and the connecting frame and the circuit module and wherein the frame cover comprises a first opening exposing the display panel and a second opening exposing the battery.

7. The clip-type mobile terminal of claim 6, wherein a fixing rib configured to fix the circuit module is disposed on the frame cover by being projected from an inner surface of the frame cover confronting the circuit module.

8. The clip-type mobile terminal of claim 6, wherein a multitude of hooks and a multitude of bosses are disposed on peripheries of the first and second openings by being projected inward.

9. The clip-type mobile terminal of claim 8, further comprising:
a panel cover covering a periphery of the display panel by being coupled with a multitude of the hooks; and
a battery cover covering a front side of the battery by being coupled with a multitude of the hooks.

10. The clip-type mobile terminal of claim 9, wherein each of the panel cover and the battery cover is formed of a same material of the frame cover and wherein each of the panel cover and the battery cover is formed of a material different from that of each of the first frame, the second frame and the connecting frame.

11. The clip-type mobile terminal of claim 1, further comprising a finger clip configured to sense deformations of the first and second frames by being connected to the circuit module and the connecting frame.

12. The clip-type mobile terminal of claim 11, the finger clip comprising:
a first clip configured to come in contact with the frame and a rear surface of the circuit module;
a second clip configured to be connected to the first clip and come in contact with the second frame and a front surface of the circuit module;
a first sensor configured to be projected and disposed on the first clip and connect the first frame and the first clip to each other electrically; and
a second sensor configured to be projected and disposed on the second clip and connect the second frame and the second clip to each other electrically.

13. The clip-type mobile terminal of claim 1, wherein at least one perforated hole is formed in one side of at least one of the first frame and the second frame.

14. The clip-type mobile terminal of claim 13, wherein at least one sensor is disposed on a region having the perforated hole formed therein, wherein the sensor is exposed through the perforated hole, and wherein the sensor recognizes a presence or non-presence of attachment of the case by sensing a space between the first frame and the second frame.

15. The clip-type mobile terminal of claim 14, wherein a pad is disposed between either the first frame or the second frame and the sensor.

16. The clip-type mobile terminal of claim 15, wherein a hole for exposure of the sensor is formed in the pad.

17. The clip-type mobile terminal of claim 1, wherein a body region of each of the first and second frames is formed of a first material, wherein an edge region of each of the first and second frames is formed of a second material, and wherein the first material is different from the second material.

18. The clip-type mobile terminal of claim 17, wherein at least one coupling hole is formed in the edge region of each of the first and second frames.

19. A clip-type mobile terminal, comprising:
- a case forming an exterior of the mobile terminal;
- a display panel disposed on a front part of the case; and
- a battery disposed on a rear part of the case,
- wherein the case comprises a first frame supporting the display panel, a second frame supporting the battery and a connecting frame connecting one side of the first frame and one side of the second frame to each other, and
- wherein the first frame and the second frame are disposed in a manner of leaving a space in-between by a predetermined gap, and further comprising:
- a circuit module configured to activate the display panel by being installed on an outer surface of the connecting frame; and
- a finger clip configured to sense deformations of the first and second frames by being connected to the circuit module and the connecting frame, the finger clip comprising:
  - a first clip configured to come in contact with the frame and a rear surface of the circuit module;
  - a second clip configured to be connected to the first clip and come in contact with the second frame and a front surface of the circuit module;
  - a first sensor configured to be projected and disposed on the first clip and connect the first frame and the first clip to each other electrically; and
  - a second sensor configured to be projected and disposed on the second clip and connect the second frame and the second clip to each other electrically.

* * * * *